US009505863B2

(12) United States Patent
Paul et al.

(10) Patent No.: US 9,505,863 B2
(45) Date of Patent: Nov. 29, 2016

(54) PROCESS FOR THE PRODUCTION OF RUBBER IONOMERS AND POLYMER NANOCOMPOSITES

(75) Inventors: Hanns-Ingolf Paul, Leverkusen (DE); Rolf Feller, Mettmann (DE); Paul Wagner, Düsseldorf (DE); John Lovegrove, Sarnia (CA); Adam Gronowski, Sarnia (CA); Phil Magill, London (CA); Dana Adkinson, London (CA); Jörg Kirchhoff, Köln (DE)

(73) Assignee: LANXESS INTERNATIONAL SA, Granges-Paccot (CH)

( * ) Notice: Subject to any disclaimer, the term of this patent is extended or adjusted under 35 U.S.C. 154(b) by 891 days.

(21) Appl. No.: 13/635,793

(22) PCT Filed: Mar. 23, 2011

(86) PCT No.: PCT/EP2011/054411
§ 371 (c)(1),
(2), (4) Date: May 2, 2013

(87) PCT Pub. No.: WO2011/117277
PCT Pub. Date: Sep. 29, 2011

(65) Prior Publication Data
US 2013/0217833 A1 Aug. 22, 2013

(30) Foreign Application Priority Data

Mar. 24, 2010 (EP) .................................... 10157591
Mar. 25, 2010 (EP) .................................... 10157703

(51) Int. Cl.
*C08F 8/40* (2006.01)
*C08F 290/14* (2006.01)
*C08F 8/00* (2006.01)
*C08F 236/16* (2006.01)
*C08C 2/00* (2006.01)
*C08C 19/12* (2006.01)
*C08C 19/32* (2006.01)
*C08F 6/00* (2006.01)
*C08L 15/02* (2006.01)
*B29C 47/36* (2006.01)
*B29C 47/38* (2006.01)

(52) U.S. Cl.
CPC ............ *C08F 236/16* (2013.01); *B29C 47/364* (2013.01); *B29C 47/38* (2013.01); *C08C 2/00* (2013.01); *C08C 19/12* (2013.01); *C08C 19/32* (2013.01); *C08F 6/003* (2013.01); *C08L 15/02* (2013.01)

(58) Field of Classification Search
CPC ...... C08F 236/16; C08F 6/0036; C08C 2/00; C08C 19/32; C08C 19/12; B29C 47/38; B29C 47/364; C08L 15/02; C08L 23/283
USPC ........... 525/340, 55, 50, 165, 232, 191, 317, 525/242, 313, 193, 192, 199, 70, 88; 520/1
See application file for complete search history.

(56) References Cited

U.S. PATENT DOCUMENTS

| | | | |
|---|---|---|---|
| 6,811,294 B1 * | 11/2004 | Elsner .................. | B29C 47/762 366/139 |
| 6,833,096 B2 | 12/2004 | Wang et al. | |
| 6,960,632 B2 | 11/2005 | Kaszas | |
| 7,019,063 B2 | 3/2006 | Wada et al. | |
| 7,491,764 B2 | 2/2009 | Dias et al. | |
| 7,501,460 B1 * | 3/2009 | Weng ..................... | B82Y 30/00 523/351 |
| 7,514,491 B2 | 4/2009 | Weng et al. | |
| 7,662,480 B2 | 2/2010 | Resendes et al. | |
| 7,915,333 B2 | 3/2011 | Resendes et al. | |
| 2004/0122155 A1 | 6/2004 | Pazur | |
| 2006/0066012 A1 | 3/2006 | Yang et al. | |
| 2008/0207815 A1 * | 8/2008 | Resendes ............. | C08F 210/12 524/445 |
| 2008/0262196 A1 * | 10/2008 | Giammattei ........ | B29C 47/0871 528/481 |
| 2009/0182095 A1 | 7/2009 | Resendes et al. | |
| 2009/0203850 A1 | 8/2009 | Parent et al. | |
| 2009/0209694 A1 | 8/2009 | Liberman et al. | |
| 2010/0010140 A1 | 1/2010 | Resendes et al. | |
| 2010/0036037 A1 | 2/2010 | Osman et al. | |
| 2013/0217833 A1 | 8/2013 | Paul et al. | |

FOREIGN PATENT DOCUMENTS

| | | |
|---|---|---|
| EP | 2154178 A1 | 2/2010 |
| JP | 2000239397 A | 9/2000 |

OTHER PUBLICATIONS

"Vulcanization", Enclyclopedia of Polymer Science and Engineering, vol. 17, John Wiley & Sons, New York, pp. 666 et seq.
Parent et al., Synthesis and Characterization of Isobutylene-Based Ammonium and Phosphonium Bromide Ionomers, Macromolecules 2004, 37, American Chemical Society, pp. 7477-7488.
Parent et al., "Isobutylene-based ionomer composites: siliceous filler reinforcement", Polymer 45 (2004), Elsevier Ltd., pp. 8091-8096.
International Search Report from International Application PCT/EP2011/054411 dated Jul. 28, 2011, 3 pages.

* cited by examiner

*Primary Examiner* — Ling Choi
*Assistant Examiner* — Jessica E Whiteley

(57) ABSTRACT

The invention relates to an energy efficient, environmentally favourable process for preparing water and solvent-free rubber ionomers and/or polymer nanocomposites comprising said rubber ionomers.

23 Claims, 7 Drawing Sheets

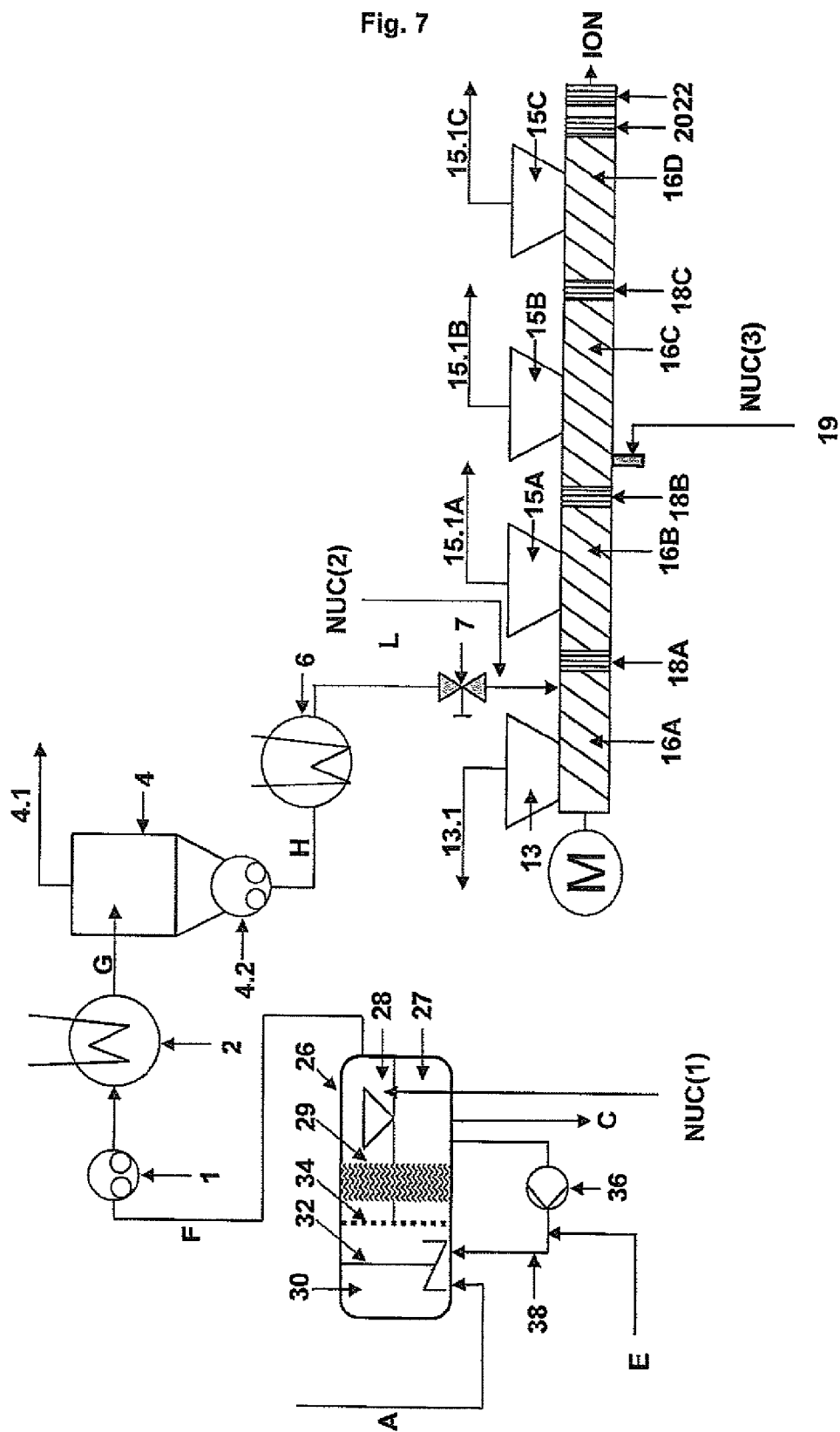

PROCESS FOR THE PRODUCTION OF RUBBER IONOMERS AND POLYMER NANOCOMPOSITES

FIELD OF THE INVENTION

The invention relates to an energy efficient, environmentally favourable process for preparing water and solvent-free rubber ionomers and/or polymer nanocomposites comprising said rubber ionomers.

BACKGROUND

The term "rubber" as used herein generally means and encompasses co-polymers of $C_4$ to $C_7$ isoolefins, $C_4$ to $C_{14}$ conjugated dienes and optionally other co-polymerizable monomers, if not defined otherwise. The term "brominated rubber" as used herein generally means and encompasses rubbers containing bromine covalently bound to the rubber polymer if not defined otherwise. An illustrative and preferred example of rubber is a rubber obtained by co-polymerization of isoprene and isobutylene, which is hereinafter also referred to as HR. Its brominated analogue is referred to as BIIR.

BIIR is a synthetic elastomer commonly known as bromobutyl rubber which has been prepared since the 1940's through the random cationic copolymerization of isobutylene with small amounts of isoprene followed by bromination with elemental bromine. As a result of its molecular structure, BIIR possesses superior air impermeability, a high loss modulus, oxidative stability and extended fatigue resist- It has been shown that treatment of BIIR and other brominated rubbers with nitrogen and/or phosphorus based nucleophiles leads to the generation of ionomers with interesting physical and chemical properties, which are dependent inter alia on their initial isoprene content (see EP 1 922 361 A, EP 1 913 077 A, Parent, J. S.; Liskova, A.; Whitney, R. A.; Parent, J. S.; Liskova, A.; Resendes, R. Polymer 45, 8091-8096, 2004, Parent, J. S.; Penchi, A.; Guillen-CasteUanos, S. A.; Liskova, A.; Whitney, R. A. Macromolecules 37, 7477-7483, 2004).

Said ionomers are often used to prepare polymer nanocomposites which are obtained upon incorporation of nanosized fillers into the ionomer matrix. Hybrid materials reinforced with neat and/or organically modified high aspect ratio plate-like fillers represent the most widely studied class of polymer nanocomposites. Strong interfacial interactions between the dispersed layers and the ionomer matrix lead to enhanced mechanical and barrier properties over the conventional composites. Among the many areas of polymer nanocomposites research, the tire industry has become particularly interested in high aspect ratio fillers. Recent studies have shown that the addition of high aspect ratio fillers in tire inner liner formulations have shown an increase in oxygen impermeability of up to 40% (see, for example, U.S. Pat. No. 7,019,063, EP 1 942 136 A, U.S. Pat. Nos. 7,501, 460 and 7,514,491).

Maximizing high aspect ratio fillers to their highest potential requires the correct morphology, making the selection of both the ionomer and the filler critical. Ionomer intercalation into the platelet galleries, delamination and exfoliation of the platelets and the anisotropic alignment of plates in the ionomer matrix must be achieved. In order to accomplish at the very least the intercalation and delamination, it is advantageous to establish a chemical link between the ionomer matrix and the filler surface.

The ionomers, in particular the butyl ionomers, used to prepare polymer nanocomposites are typically prepared in a multistep procedure comprising a slurry polymerization, solution bromination, isolation of the brominated rubber and a subsequent kneading reaction to form the ionomers and the nanocomposites.

In the conventional slurry process e.g. for producing bromobutyl rubber (BIIR), isobutylene and isoprene monomers are first polymerized in a polar halohydrocarbon medium, such as methyl chloride with an aluminum based initiating system, typically either aluminum trichloride ($AlCl_3$) or ethyl aluminum dichloride ($EtAlCl_2$). The butyl rubber does not appreciably dissolve in this polar medium, but is present as suspended particles and so this process is normally referred to as a slurry process. Residual monomers and polymerization medium are then steam stripped from the butyl rubber, before it is dissolved in a bromination medium, typically a non-polar medium such as hexane. Just recently, a method of using a common solvent system was disclosed in WO2010/006983 A.

Brominated rubbers are typically produced by contacting a solution of non-brominated rubber in an alkane with bromine in an agitated vessel. Said solution is generally denoted as cement. Unreacted bromine and hydrogen bromide formed as byproduct are neutralized by the addition of a caustic solution. Additives can also be incorporated at that stage. The resulting solution is then steam-stripped to remove the solvent, thereby coagulating the rubber into a solid product. The solid product is generally recovered as a 5 to 12% slurry in water. Stabilizers and/or antioxidants are added to the brominated rubber immediately before recovery. The brominated rubber is then finished using mechanical drying equipment in a process analogous to that used for regular (unbrominated) rubbers; however, because of the greater reactivity of the brominated product, less severe conditions are employed. The isolated, dry brominated rubbers are then used to prepare ionomers and nanocomposites by reaction with nucleophiles and mixing with fillers which is typically effected by the action of kneaders.

The aforementioned processes for coagulation, steam stripping and kneading suffer from very high energy consumption. A large amount of steam is necessary not only to evaporate the solvent but also to heat and maintain the complete water content of the stripping drums at a high temperature. Additional steam addition is also necessary to strip off residual amounts of solvent by lowering the partial pressure of the solvent in the stripping drum.

The aforementioned processes also utilize a large amount of water because the concentration of brominated rubbers in the slurry after coagulation is generally only 5% to 20% for brominated rubbers. All water from this slurry constitutes waste water and must be disposed of. While the waste water contains sodium salts from the neutralization, reworking and recycling the waste water to remove the sodium salts is not economically viable because the salt concentration is too low.

The crumbs of brominated rubber are separated from the bulk water mechanically using simple sieve trays or screens. The brominated rubber still contains approximately 30 to 50% water after this first separation. Further mechanical drying is then conducted using extruders by kneading the product and squeezing out the water. The disadvantage of this mechanical drying process is the contamination of water by small rubber particles that were not held back by the sieves with the result that the waste water requires additional treatment.

The aforementioned mechanical dewatering can only diminish moisture content down to approximately 5 to 15%. Additional thermal drying stages are then required. The rubber is thereby heated to 150 to 200° C. under pressure in a single screw or twin screw extruder. A die plate is installed to maintain the pressure. When the rubber is pushed through the die plate, the water in the rubber evaporates and forms open porous crumbs. A cutting device then cuts the crumbs into small pieces. The crumbs are conveyed to a convective dryer where residual moisture is removed by hot air. After such drying, the brominated rubber generally has a moisture content of 0.1 to 0.7%.

The aforementioned processes for drying brominated rubbers is complex and requires extensive equipment. Furthermore, the process parameters must be carefully monitored to avoid heat and shear stress, which would accelerate degradation of the brominated rubber. In addition to that, the subsequent formation of ionomers by reaction of brominated rubbers with nucleophiles such as phosphorous and nitrogen bearing nucleophiles and the sufficient intercalation and delamination of the filler in the ionomer matrix requires a very high input of mechanical energy.

Various other special processes have been developed with the aim of isolating elastomeric polymers by removing water and volatile organic solvents from cements. Extruder degassing in vacuum with or without the use of entrainers has gained acceptance in practical applications as the most important technique, however, the energy requirements of such prior art processes are quite high.

U.S. Pat. No. 5,283,021 A1 discloses a two step process for removing solvent from an elastomeric polymer solution. The polymer solution is thereby heated directly by a heating fluid and sprayed under vacuum. During the spraying, the solvent is evaporated, thereby forming crumbs which are then fed to an extruder for further degassing. However, crumb formation at that stage is not desirable.

In view of the foregoing, an object of the present invention was therefore to provide a continuous, energy efficient, ecologically and economically favourable process to prepare rubber ionomers and polymer nanocomposites.

This object is solved by a process for the preparation of rubber ionomers comprising at least the steps of:
a) feeding
  a concentrated fluid (L) containing at least one brominated rubber and at least one volatile compound
  and at least one nitrogen and/or phosphorous containing nucleophile.
  into an extruder unit comprising at least
  an extruder degassing section comprising at least a conveying section and at least one vent port with one or more vapor lines,
  an accumulating section and
  an outlet section,
and
b) at least partially reacting the brominated rubber or the brominated rubbers with the nitrogen and/or phosphorous containing nucleophile or the nitrogen and/or phosphorous containing nucleophiles within the extruder unit whereby rubber ionomers (ION) are formed and volatile compounds are at least partially removed through the vent ports and vapor lines.

The scope of the invention encompasses any possible combination of definitions, parameters and illustrations listed herein whether in general or within areas of preference.

Another aspect of the invention relates to a process for the preparation of polymer nanocomposites comprising at least the steps of:
a*) feeding
  a concentrated fluid (L) containing at least one brominated rubber and at least one volatile compound
  and at least one nitrogen and/or phosphorous containing nucleophile
  and at least one filler
  into an extruder unit comprising at least
  an extruder degassing section comprising at least a conveying section and at least one vent port with one or more vapor lines,
  an accumulating section and
  an outlet section,
and
b*) reacting the brominated rubber or the brominated rubbers with the nitrogen and/or phosphorous containing nucleophile or the nitrogen and/or phosphorous containing nucleophiles whereby rubber ionomers (ION) are formed and
  formation of polymer nanocomposites by reaction of
  the brominated rubber or the brominated rubbers and the nitrogen and/or phosphorous containing nucleophile or the nitrogen and/or phosphorous containing nucleophiles and/or
  the rubber ionomers (ION)
  with at least one filler
  whereby the aforementioned reaction and the aforementioned formation are at least partially effected within the extruder unit and whereby volatile compounds are at least partially removed through the vent ports and vapor lines.

In one embodiment of the invention, the concentrated fluid (L) fed into the extruder unit to prepare rubber ionomers or polymer nanocomposites is obtained by the steps of
i) treating a fluid (F) in at least one concentrator unit comprising at least a heater, a degassing vessel (4) and a vapor line, whereby the fluid (F) is heated, the heated fluid (G) is fed into a degassing vessel where part of the volatile compounds are removed via the vapor line to obtain a concentrated fluid (H),
ii) reheating the concentrated fluid (H) from step i) in at least one reheating unit to obtain a the concentrated fluid (L).

In one embodiment of the invention the nucleophiles (NUC) and/or the fillers, which are finally fed into the extruder unit are already added to fluid (F).

In one embodiment of the invention, the concentrated fluid (L) is free-flowing. In the context of this invention, the term "free-flowing" means a viscosity in the range of 500 to 50.000.000 mPa*s, preferably 5.000 to 30.000.000 in Pa*s and most preferably 10.000 mPa*s to 300.000 mPa*s.

As far as not mentioned otherwise the viscosity values of fluids refer to the zero shear viscosity extrapolated from measurements at given temperature using a Haake Rheostress RS 150 viscosimeter or a rotational rheometer of cone-plate type for very viscous samples. The extrapolation is performed by taking a $2^{nd}$ order polynomial to reflect the shear stress vs shear rate graph obtained from the measurements. The linear portion of the polynomial reflects the slope at a shear rate of zero and thus is the zero shear viscosity. In the context of this invention, the term "substantially free of volatile compounds" means a total concentration of volatile compounds of less than 1 wt.-%, preferably less than 0.5 wt.-% based on the mass of the rubber ionomer or the polymer nanocomposite.

In the context of this invention, the term "formation of polymer nanocomposites" includes ionomer intercalation, delamination and exfoliation of filler particles in the rubber ionomer i.e. the establishment of an interaction between the ionomer and the filler surface.

In the context of this invention, the terms "at least partially reacting" and "at least partial formation" within the extruder unit shall mean, without wanting to be bound by theory, that the reaction is typically induced and performed by the introduction of mechanical and/or thermal energy by the extruder. However, it is clear for one skilled in the art that, depending on the reactivity of the nucleophiles and the brominated rubber employed, the reaction may also already start upon mixing the concentrated fluid L or any preceding fluid with the nucleophile.

In one embodiment at least 20%, preferably at least 50% of the ionomer and for nanocomposite formation is performed in the extruder unit calculated on the limiting compound or functional group.

In another embodiment least 80%, preferably at least 95% or 100% of the ionomer and/or nanocomposite formation is performed in the extruder unit calculated on the limiting compound or functional group.

Polymer nanocomposites (NC) may generally also be formed in situ in the presence of brominated rubber, nucleophile and filler within the extruder unit.

In particular, the term "substantially free of volatile compounds" means substantially free of water and substantially free of volatile organic compounds.

Rubber ionomers or polymer nanocomposites are considered to be substantially free of water, if the residual water concentration is less than 0.5 wt.-% preferably less than 0.25 wt % and most preferably less than 0.1 wt % based on the mass of the polymer.

In the context of this invention, the term "volatile organic compounds" means organic compounds having a boiling point of below 250° C. at standard pressure.

Rubber ionomers or polymer nanocomposites are considered substantially free of volatile organic compound, if the residual concentration of said volatile organic compounds is less than 0.75 wt.-% preferably less than 0.25 wt % and most preferably less than 0.1 wt % based on the mass of the polymer. Said volatile organic compounds are typically the solvents employed in the polymerization or subsequent processing steps like a bromination step and include hydrocarbons such as hexanes and pentanes.

As used herein, the term brominated rubber includes bromobutyl rubbers, brominated terpolymers such as those described in U.S. Pat. No. 6,960,632 and Kaszas et al., Rubber Chemistry and Technology, 2001, 75, 155 where para-methylstyrene is added to the mixed feed of butyl polymerizations (Methyl chloride, isobutylene and isoprene mixed feed, with aluminum trichloride/water mixtures as initiator) resulting in a high molecular weight polymer with up to 10 mol % of styrenic groups randomly incorporated along the polymer chain The incorporation of para-methylstyrene is found to be uniform throughout the molecular weight distribution due to the similarity in reactivity with isobutylene. The isoprene moieties within the butyl terpolymers can be brominated by conventional methods. Alternatively, a brominated terpolymer may comprise a $C_4$ to $C_7$ isomonoolefin, such as isobutylene, and a comonomer, such as para-alkylstyrene, preferably para-methylstrene. The aforementioned copolymers are commercially available under the tradename EXXPRO 3035, 3433, 3745. When brominated, some of the alkyl substituent groups present in the styrene monomer units contain a benzylic bromide formed from bromination of the polymer. Preferred brominated rubbers are bromobutyl rubbers.

In the context of this invention butyl rubber denotes a (co)-polymer of isobutene (2-methylpropene) and isoprene (2-methylbuta-1,3-diene). On a molar basis, the isoprene content in the polymer is between 0.001% and 20, preferably between 0.1 and 10 mol-% and more preferably between 1.8 and 2.3 mol %. Butyl rubber is composed of linear polyisobutene chains with randomly distributed isoprene units. The isoprene units introduce unsaturated sites into the polymer chain to enable vulcanization. The mass average molecular weight of butyl rubber molecules Mw is typically between 50,000 and 1,000,000 g/mol, preferably between 300,000 and 1,000,000 g/mol.

The bromobutyl rubbers also contain a certain amount of bromine covalently bound to the butyl rubber molecules. The amount of covalently bound bromine is typically in the range of more than 0 to 8 wt.-% with respect to total mass of the polymer. The bromobutyl rubbers may also contain additives, e.g. 0.0001 to 4 phr (phr=parts per hundred rubber with respect to rubber weight), epoxidized soy bean oil (ESBO), 0.0001 to 5 phr calcium-stearate and 0.0001 to 0.5 phr antioxidants. Other additives are also applicable, dependent on the application of the bromobutyl rubber product, i.e. fillers or colorants.

In case of bromobutyl rubber, the typical bromine content in the product is 1.5 to 2.5 wt.-%, preferably 1.6 to 2.0 wt.-%.

As used herein, the term "nucleophile" denotes a compound having a lone electron pair located on nitrogen or phosphorous which is capable of forming a covalent bond to form phosphonium or ammonium ions.

Preferred nitrogen and/or phosphorous containing nucleophiles are those of formula I $$AR^1R^2R^3 \qquad (I)$$

wherein

A denotes nitrogen or phosphorus and $R^1$, $R^2$ and $R^3$ are independently of each other selected from the group consisting of $C_1$-$C_{20}$-alkyl, $C_6$-$C_{20}$-arylalkyl or $C_5$-$C_{14}$-aryl.

$C_1$-$C_{18}$-alkyl denotes a straight-chain, cyclic, branched or unbranched alkyl radical which may optionally be further substituted to form alcohols, ethers, carboxylic acids, nitriles, ethoxylated amines, acrylates, esters and ammonium ionomer. The same applies to the alkyl moiety of an $C_6$-$C_{15}$-arylalkyl radical.

$C_5$-$C_{14}$-aryl not only denotes carbocyclic radicals but also heteroaromatic radicals in which zero, one, two or three carbon atoms of each aromatic each ring, but at least one carbon atom in the whole radical, is replaced by a heteroatom selected from the group of nitrogen, sulphur or oxygen.

Alkoxy denotes a straight-chain, cyclic or branched or unbranched alkoxy radical.

Preferred nucleophiles of formula (I) are those wherein two or three of the residues $R^1$, $R^2$ and $R^3$ are identical.

More preferred nucleophiles of formula (I) are:

Trimethylamine, triethylamine, triisopropylamine, tri-n-butylamine, trimethylphosphine, triethylphosphine, triisopropylphosphine, tri-n-butyl-phosphine, triphenylphosphine, 2-dimethylaminoethanol, dimethylaminoethylacrylate, dimethylaminomethylacrylate, N-methylamino-bis-2-propanol, n-ethylamino-bis-2-propanol, dimethyaminoethylmethacrylate, 1-dimethylamino-2-propanol, 2-(isopropylamino)ethanol, 3-dimethylamino-1-propanol, N-methyldiethanolamine, 2-(diethylamino)

ethanol, 2-dimethylamino-2-methyl-1-propanol, 2-[2-(dimethylamino)-ethoxy]ethanol, 4-(dimethylamino)-1-butanol, N-ethyldiethanolamine, triethanolamine, tripropanolamine, aminolauric acid, betaine, 3-diethylamino-1-propanol, 3-(diethylamino)-1,2-propanediol, 2-{[2-(dimethylamino)ethyl]methylamino}ethanol, 4-diethylamino-2-butyn-1-ol, 2-(diisopropylamino)ethanol, N-butyldiethanolamine, N-tert-butyldiethanolamine, 2-(methylphenylamino)ethanol, 3-(dimethylamino)benzyl alcohol, 2-[4-(dimethylamino)phenyl]ethanol, 2-(N-ethylanilino)ethanol, N-benzyl-N-methylethanolamine, N-phenyldiethanolamine, 2-(dibutylamino)ethanol, 2-(N-ethyl-N-m-toluidino)ethanol, methylphenylimino)diethanol, tris[2-(2-methoxyethoxy)ethyl]amine, 3-(dibenzylamino)-1-propanol, dimethyl hydrogenated tallow alkyl amine or mixtures of the aforementioned nucleophiles.

Since the nucleophiles preferably react with an allylic or benzylic bromide functionality of brominated rubbers, the resulting ionomeric moiety is typically a repeating unit derived from an allylic or benzylic bromide. The total content of ionomeric moiety in the rubber ionomer therefore cannot exceed the starting amount of allylic or benzylic bromide in the brominated rubber; however, residual allylic or benzylic bromides and/or residual multiolefins may be present. According to the present invention the resulting rubber ionomer could also be a mixture of the polymer-bound ionomeric moiety and allylic or benzylic bromide such that the total molar amount of ionomeric moiety and allylic and/or benzylic halide functionality are present in the range of 0.05 to 20.0 mol %, more preferably from 0.2 to 1.0 mol % and even more preferably from 0.5 to 0.8 mol % with residual multiolefin being present in the range from 0.2 to 5 mol % and even more preferably from 0.5 to 0.8 mol %. Residual allylic or benzylic bromides may be present in an amount of from 0.1 mol % up to an amount not exceeding the original allylic or benzylic bromide content of the brominated rubber used to produce the rubber ionomer. Residual multiolefin may be present in an amount of from 0.1 mol % up to an amount not exceeding the original multiolefin content of the unbrominated rubber used to produce the brominated rubber. Typically, the residual multiolefin content of the rubber ionomer is at least 0.4 mol %, preferably at least 0.6 mol %, more preferably at least 1.0 mol %, yet more preferably at least 2.0 mol %, still more preferably at least 3.0 mol %, even more preferably at least 4.0 mol %.

As used herein, the term "filler" includes particles of a mineral, such as, for example, silica, silicates clay (such as for example bentonite), gypsum, alumina, titanium dioxide, talc and the like, as well as mixtures thereof in amounts of 1 to 80 phr.

Further examples of suitable fillers include:
a highly dispersable silicas, prepared e.g. by the precipitation of silicate solutions or the flame hydrolysis of silicon halides, with specific surface areas of 5 to 1000, preferably 20 to 400 m 2/g (BET specific surface area), and with primary particle sizes of 10 to 400 nm; the silicas can optionally also be present as mixed oxides with other metal oxides such as Al, Mg, Ca, Ba, Zn, Zr and Ti;
synthetic silicates, such as aluminum silicate and alkaline earth metal silicate;
magnesium silicate or calcium silicate, with BET specific surface areas of 20 to 400 m2/g and primary particle diameters of 10 to 400 nm;
natural silicates, such as kaolin and other naturally occurring silica;
natural clays, such as montmorillonite and other naturally occurring clays;
organophilically modified clays such as organophilically modified montmorillonite clays (e.g. Cloisite® Nanoclays available from Southern Clay Products) and other organophilically modified naturally occurring clays;
glass fibers and glass fiber products (matting, extrudates) or glass microspheres;
metal oxides, such as zinc oxide, calcium oxide, magnesium oxide and aluminum oxide;
metal carbonates, such as magnesium carbonate, calcium carbonate and zinc carbonate;
metal hydroxides, e.g. aluminum hydroxide and magnesium hydroxide
or combinations of the aforementioned fillers.

In an embodiment of the invention the fillers are selected from the group of high aspect ratio fillers.

As used herein the term "high aspect ratio" means an aspect ratio of at least 1:3, whereby the aspect ratio is defined as the ratio of mean diameter of a circle of the same area as the face of the plate to the mean thickness of the plate. The aspect ratio for needle and fiber shaped fillers is the ratio of length to diameter.

The fillers may include acircular or nonisometric materials with a platy or needle-like structure. Preferable high aspect ratio fillers have an aspect ratio of at least 1:3, more preferably at least 1:7, yet more preferably from 1:7 to 1:250. Fillers in accordance with the present invention have a mean particle size in the range of from 0.001 to 100 microns, preferably between 0.005 and 50 microns and more preferably between 0.01 and 10 microns.

A suitable filler has a BET surface area, measured in accordance with DIN (Deutsche Industrie Norm) 66131, of 5 to 200 square meters per gram.

In a preferred embodiment the high aspect ratio fillers are selected from the group consisting of nanoclays, preferably an organically modified nanoclay. The present invention is not limited to a specific nanoclay; however, natural powdered smectite clays, such as sodium or calcium montmorillonite, or synthetic clays such as hydrotalcite and laponite are preferred as starting materials. Organically modified montmorillonite nanoclays are especially preferred. The clays are preferably modified by substitution of the transition metal for an onium ion, as is known in the art, to provide surfactant functionality to the clay that aids in the dispersion of the clay within the generally hydrophobic polymer environment. Preferred onium ions are phosphorus based (eg: phosphonium ions) and nitrogen based (eg: ammonium ions) and contain functional groups having from 2 to 20 carbon atoms (eg: $NR_4^{+-}$ MMT).

The clays are preferably provided in nanometer scale particle sizes, preferably less than 25 μm by volume, more preferably from 1 to 50 μm, still more preferably from 1 to 30 μm, yet more preferably from 2 to 20 μm.

In addition to silica, the preferred nanoclays may also contain some fraction of alumina. The nanoclays may contain from 0.1 to 10 wt.-% alumina, preferably 0.5 to 5 wt.-%, more preferably 1 to 3 wt.-% alumina.

Examples of preferred commercially available organically modified nanoclays suitable for use as high aspect ratio fillers according to the present invention are sold under the tradenames Cloisite® clays 10A, 20A, 6A, 15A, 30B, or 25A and Nanomer® 1.44P, 1.44PS, and 1.34TCN. Other examples of high aspect ratio fillers include Polyfil 80™, Mistron Vapor™, Mistron HAR™, Mistron CB™ as well as hydrotalcite clays such as Perkalite LD, or Perkalite F100.

The high aspect ratio fillers are present in polymer nanocomposites in an amount of from 1 to 80 phr, more preferably from 2 to 20 phr, yet more preferably from 5 to 20 phr.

The subject of the invention will be described in more detail by means of schematic drawings in which:

FIGS. 1 and 2 each show an extruder unit comprising three extruder degassing sections three accumulating sections and one outlet section, whereby one extruder degassing section is a backward degassing section.

FIG. 7 shows a single-stage prewashing unit, a single-stage concentrator unit, a reheating unit and an extruder unit comprising a pressure regulation device, four extruder degassing sections, four accumulating sections, an optional side feeder and one outlet section, whereby one extruder degassing section is a backward degassing section.

Figure 1:
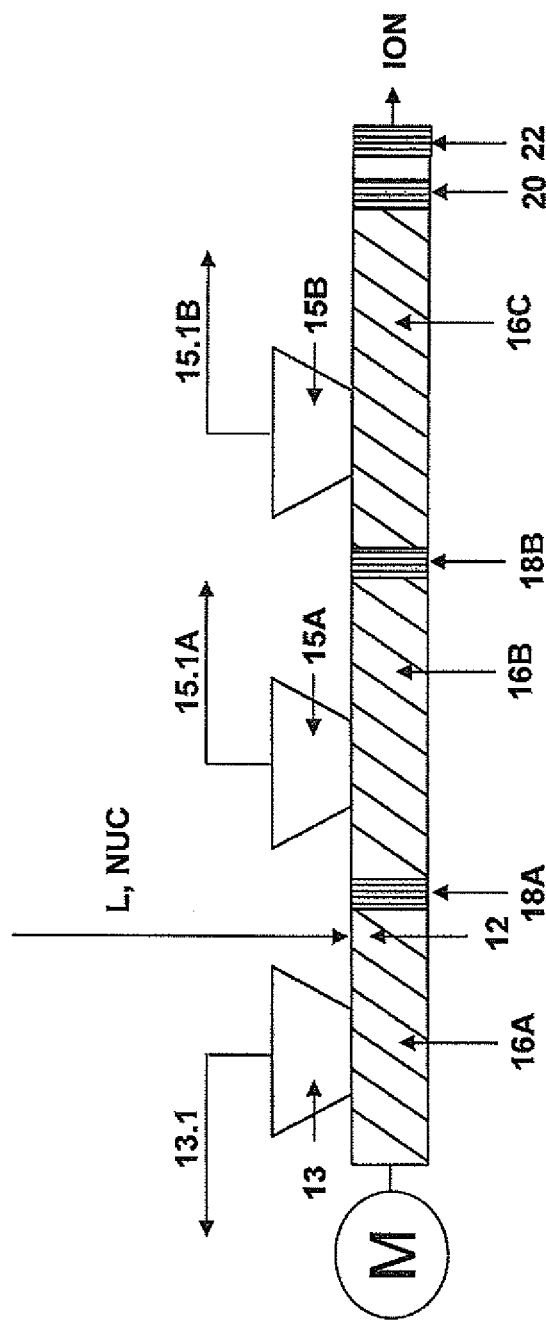
Figure 2:
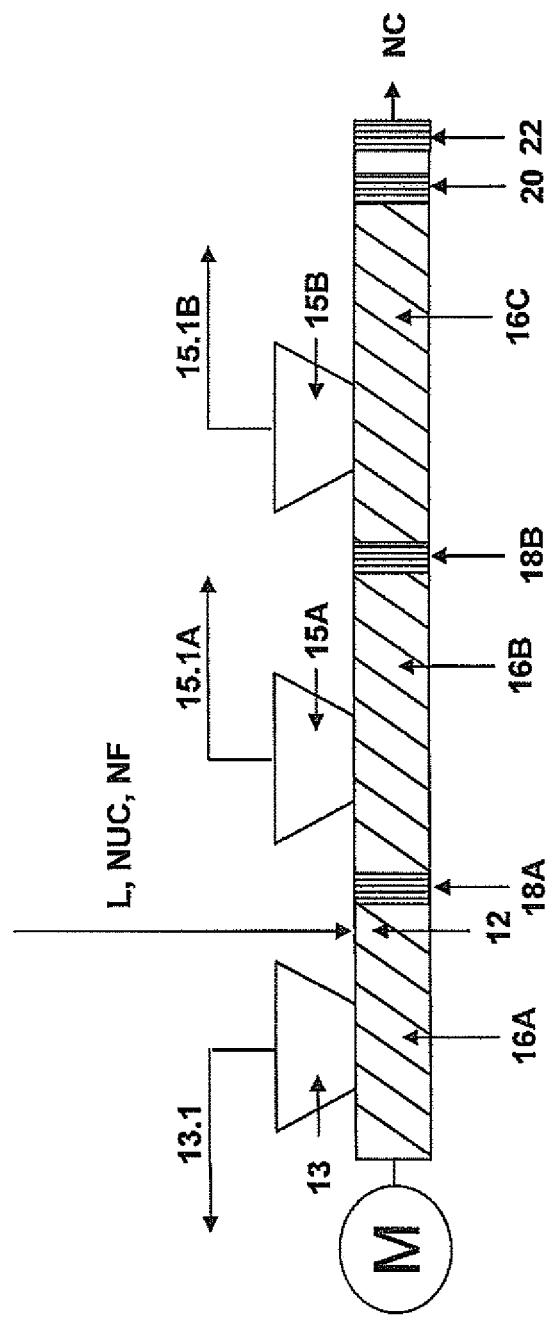

A basic and exemplary embodiment of the process steps a) and b) and a device suitable to perform said process steps is shown in FIG. 1. A basic and exemplary embodiment of the process steps a*) and b*) and a device suitable to perform said process steps is shown in FIG. 2.

In step a), the concentrated fluid L and at least one nitrogen and/or phosphorous containing nucleophile (NUC) are fed into an extruder unit at the feeding point 12.

In step a*), the concentrated fluid L, at least one nitrogen and/or phosphorous containing nucleophile (NUC) and a filler (NF) are fed into an extruder unit at the feeding point 12.

The extruder unit may comprise one or more extruders connected in series. At least one of these extruders comprises an extruder degassing section comprising at least a conveying section and at least one vent port with one or more vapor lines, an accumulating section and an outlet section. If more than one extruder is used, typically only the last one comprises an outlet section as defined below.

Suitable extruder types include single screw and multi-screw extruders comprising any number of barrels and types of screw elements and other single or multishaft conveying kneaders. Possible embodiments of multiscrew extruders are twin-screw extruders, ring extruders or planetary roller extruders, whereby twin-screw extruders and planetary roller extruders are preferred.

Single screw extruders include those having an axial oscillating screw. Twin screw extruders are for example counter-rotating intermeshing, counter-rotating non-intermeshing, co-rotating intermeshing and co-rotating non-intermeshing twin screw extruders, whereby co-rotating intermeshing twin screw extruders are preferred.

In one embodiment of the invention the extruders can either be heated via the barrels to temperatures up to 300° C. or cooled.

In a preferred embodiment, the extruder comprises means to operate separate zones independently of each other at different temperatures so that the zones can either be heated, unheated or cooled. In another preferred embodiment the extruder comprises for each conveying section at least one separate zone, which can be operated independently at different temperatures.

Preferred extruder materials should be non-corrosive and should substantially prevent the concentrated fluid L, the nucleophiles (NUC) and the rubber ionomers (ION) or the polymer nanocomposites (NC) from being contaminated with metal or metal ions. Preferred extruder materials include nitrided steel, duplex steel, stainless steel, nickel-based alloys, composite materials like sintered metals, hot isostatic pressed materials, hard wear resistant materials like Stellite, coated metals with coatings for example made from ceramics, titanium nitride, chromium nitride and diamond like carbon (DLC).

The conveying sections 16A, 16B and 16C are open to vent ports 13, 15A and 15B. In the conveying sections 16A, 16B and 16C a part of the solvent is evaporated and separated from the reheated concentrated fluid L. The vapors are removed through the vent ports 13, 15A and 15B via vapor lines 13.1, 15.1A and 15.1B.

In a preferred embodiment of the invention the concentrated fluid (L) is injected into the first extruder degassing section of the extruder unit, whereby the first extruder degassing section comprises one or more rear vent ports in upstream direction each connected to a vapor line.

The advantage of rear vent ports is that the volatile compounds present in the concentrated fluid L undergo sudden and rapid evaporation, thereby effecting at least partial separation of the brominated rubber, the nucleophile and optionally the filler on one hand and the volatile compounds on the other hand, the vapors emerging through the rear vents in upstream direction. Generally, from about 20 to about 99 wt-%, of the volatile compounds present in the fluid L is removed through the upstream vents.

Since the evaporation volatile compounds have a tendency to entrain the concentrated fluid L, the nucleophiles (NUC), the rubber ionomers (ION) or the polymer nanocomposites (NC) towards the vent ports, in a preferred embodiment of the invention the vent ports 15 are designed to prevent the material, in particular the concentrated fluid L, the nucleophiles (NUC), the rubber ionomers (ION) or the polymer nanocomposites (NC) from coming out of the vent ports.

Suitable means to accomplish that purpose are staffer stews, that are mounted on the vent ports and convey any material back into the extruder, or rollers or belts, that are applied to the inside of the vent ports to push deposited material back into the extruder. As an alternative or in addition to the aforementioned, coatings of the vent ports may be applied which reduce or prevent sticking of the material to the surface. Suitable coatings include DLC, Ethylene-Tetrafluoroethylene (ETFE), Polytetrafluoroethylene (PTFE) and Nickel-Alloys. However, the application of stuffer screws mounted on the vent ports are preferred.

The pressure at the vent ports 13, 15A and 15B is for example between 1 hPa and 2,000 hPa, preferably between 5 hPa and 900 hPa.

The vapor lines may be and are preferably connected to a condensing system,

In general, the purpose of the condensing system is to collect volatile compounds removed by the vent ports via the vapour lines and typically comprises a condenser and a vacuum pump. Any condensing system known in the art may be used to effect the recovery of volatile compounds.

Generally, it is preferred to recycle the condensed volatile compounds, optionally after carrying out a phase separation to separate the volatile organic compounds from water, into a process for the preparation of the concentrated fluid L.

The conveying section 16C is terminated by a accumulating section 20. The purpose of the accumulation is to assure a certain pressure level in the vent port 15B and to introduce mechanical energy into the material to facilitate evaporation of volatile compounds. The accumulating section 20 may comprise any means that enable the accumulation of the material. It may be designed to include for example kneading or throttling elements, blister discs or die plates.

Examples of throttling elements are conical or cylindrical flow paths or other throttling means.

The application of kneading elements, blister discs or die plates within the accumulating section is preferred, kneading elements are even more preferred. Examples of kneading elements include kneading blocks, which may be designed as double or triple flighted forward, backward or neutral conveying kneading blocks; single or double flighted screw mixing elements with grooves, single flighted tooth mixing elements, blister plates and single, double or triple flighted eccentric discs. The kneading elements may be assembled in any combination on the screw shafts of the extruder, in particular of an twin screw counter rotating or co-rotating twin screw extruder.

A typical accumulating section comprises of 2 to 10 kneading blocks, oftentimes terminated by a back conveying type of kneading element. For mixing in of a stripping agent, tooth type elements or screw elements with grooves may be applied.

Eccentric discs are preferably applied in the last section of the extruder, where the product P is highly viscous and substantially free of volatile compounds For planetary roller extruders, kneading elements like tooth shaped rollers are or rollers with grooves and clearances are preferred.

Generally the extruder unit may comprise one or more conveying sections and one or more accumulating sections, whereby the number is only limited by constructional constraints. A typical number of conveying sections and accumulating sections is 1 to 30, preferably 2 to 20 and more preferably 3 to 15.

The last accumulating section 20 is typically designed to form a product plug at the outlet of the extruder, thereby preventing surrounding air from entering the extruder.

While passing from the conveying section 16A to the accumulating section 20 and further to the outlet section 22 the concentrated fluid L reacts with the nucleophiles (NUC) to form ionomers (step b) or, if at least one filler is present further to form nanocomposites (NC) whereby a transition from the concentrated fluid L to the products (ION or NC) is undergone.

The outlet section 22 typically comprises means to allow the rubber ionomers (ION) or polymer nanocomposites (NC) to exit the extruder and optionally but preferably product processing equipment. Examples of suitable product processing equipment includes combinations of die plates and cutters; die plates and underwater-pelletizing means; means for crumb formation like screw elements with teeth and holes; turbulators which may be designed as cylinders with holes in it, whereby the product is pressed from the outside to the inside of the cylinder, and whereby a rotating knife inside the cylinder cuts the product into pieces; fixed knifes placed at the end plate of the extruder, whereby the screw rotation causes the cutting action, which preferably is applied when working with twin screw co-rotating, single screw and planetary roller extruders.

To reduce the mechanical and thermal stress to the product, in a preferred embodiment of the invention the product processing equipment is combined with cooling means.

The cooling means comprises any means that allow the removal of heat from the product. Examples of cooling means include pneumatic crumb conveyers with convective air cooling, vibrating crumb conveyers with convective air cooling, vibrating crumb conveyer with cooled contact surfaces, belt conveyer with convective air cooling, belt conveyer with cooled belts, water spraying on hot crumbs upon outlet of the extruder and as already mentioned underwater-pelletizing means, whereby water serves as the coolant.

The rubber ionomers (ION) or polymer nanocomposites (NC) may then be processed further for final packing and shipping.

Polymer nanocomposites obtained according to b*) may also be cured for example using conventional curing systems such as sulphur, resin and peroxide in a subsequent step c*).

The preferred curing system is sulphur based. A typical sulfur-based curing system comprises: (i) a metal oxide, (ii) elemental sulfur and (iii) at least one sulfur-based accelerator, The use of metal oxides as a component in the curing system is well known in the art. A suitable metal oxide is zinc oxide, which is typically used in the amount of from about 1 to about 10, preferably from about 2 to about 5, parts by weight per hundred parts by weight butyl polymer in the nanocomposite. Elemental sulfur, comprising component (ii) of the preferred curing system is typically used in amounts of from about 0.2 to about 10 parts by weight per hundred parts by weight butyl polymer in the composition. Suitable sulfur-based accelerators (component (iii) of the preferred curing system) are typically used in amounts of from about 0.5 to about 3 parts by weight, per hundred parts by weight butyl polymer in the composition. Non-limiting examples of useful sulfur-based accelerators may be selected from the thiuram sulfides such as tetramethyl thiuram disulfide (TMTD), the thiocarbamates such as zinc dimethyl dithiocarbamate (ZDC) and the thiazyl and benzothiazyl compounds such as mercaptobenzothiazyl disulfide (MBTS). Preferably, the sulphur based accelerator is mercaptobenzothiazyl disulfide.

The cured article may contain further auxiliary products for rubbers, such as reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. The rubber aids are used in conventional amounts that depend, inter alia, on the intended use. The cured article may also contain mineral and/or non-mineral fillers. Conventional amounts are from 0.1 to 50 wt. %, based on rubber.

Further information on vulcanization processes may be obtained in Encyclopedia of Polymer Science and Engineering, Vol. 17, s. 666 et seq. (Vulcanization).

The rubber ionomers obtained according to steps a) and b) and the cured and uncured nanocomposites obtained according to steps a*), b*) and c*) may be used as a part of a tire including, but not limited to an inner liner, tread, sidewall, an adhesive, as part of a thermoplastic elastomer, footwear, storage membranes, protective clothing, pharmaceutical stoppers, linings, and barrier coatings.

In general, an increasing feed rate of the concentrated fluid L at the feeding point 12 requires a corresponding increase in the screw speed of the extruder. Moreover, the screw speed determines the residence time of concentrated fluid L. Thus, the screw speed, feed rate and the extruder diameter are typically interdependent. Typically the extruder is operated in such a manner that the dimensionless throughput $V/(n*d^3)$, wherein V denotes the Volume flow rate, n the screw speed expressed in revolutions per minute and d the effective diameter of the extruder is adjusted to about 0.01 to about 0.2 preferably to about 0.015 to about 0.1. The maximum and minimum feed rates and extruder screw speeds are determined by for example the size of the extruder, the physical properties of the brominated rubber contained in fluid L and the target values of remaining volatile compounds. Given these properties, however, the operating parameters can be determined by one skilled in the art by some initial experiments.

In one embodiment of the invention the extruder is operated at a feed rate of 1 to 25,000, preferably of 1 to 6,000 kilograms per hour.

Generally, the degassing in the extruder may be aided by the addition of a stripping agent that is removed together with other volatile compounds. Even though the stripping agent may be added anywhere in the extruder unit, the addition in one or more accumulating sections is preferred. In a more preferred embodiment a stripping agent is added in one or more accumulating sections except the last one (20).

Suitable stripping agents are substances that are inert to the concentrated fluid (L), the nucleophiles (NUC), where applicable the filler (NF) and/or the products (ION or NC)) and have a vapor pressure greater than 100 hPa at 100° C.

In the context of the invention, the term "inert" means that the stripping agent does not or virtually not react with the polymers contained in the concentrated fluid L, the nucleophiles (NUC), where applicable the filler (NT), and/or the products (ION or NC). Suitable stripping agents are nitrogen, carbon dioxide, noble gases, propane, butane, water or a mixture of the aforementioned substances, whereby carbon dioxide is preferred. The amount of stripping agent may be 0.0001 to 10, preferably 0.001 to 5 and more preferably 0.1 to 2 wt-% based on the amount of the rubber ionomer (ION) or polymer nanocomposite (NC) obtained at the outlet section.

The invention further relates to the use of a device suitable to accomplish the process according to the invention. Therefore the invention also encompasses the use of a device comprising a least
one extruder unit comprising at least one feeding point (12), at least one extruder degassing section (16), at least one one accumulating section (20) and one outlet section (22), whereby each extruder degassing section (16) further comprises at least one vent port (15) connected to a vapour line (15.1)
for the preparation of rubber ionomers and/or polymer nanocomposites.

Figure 3:
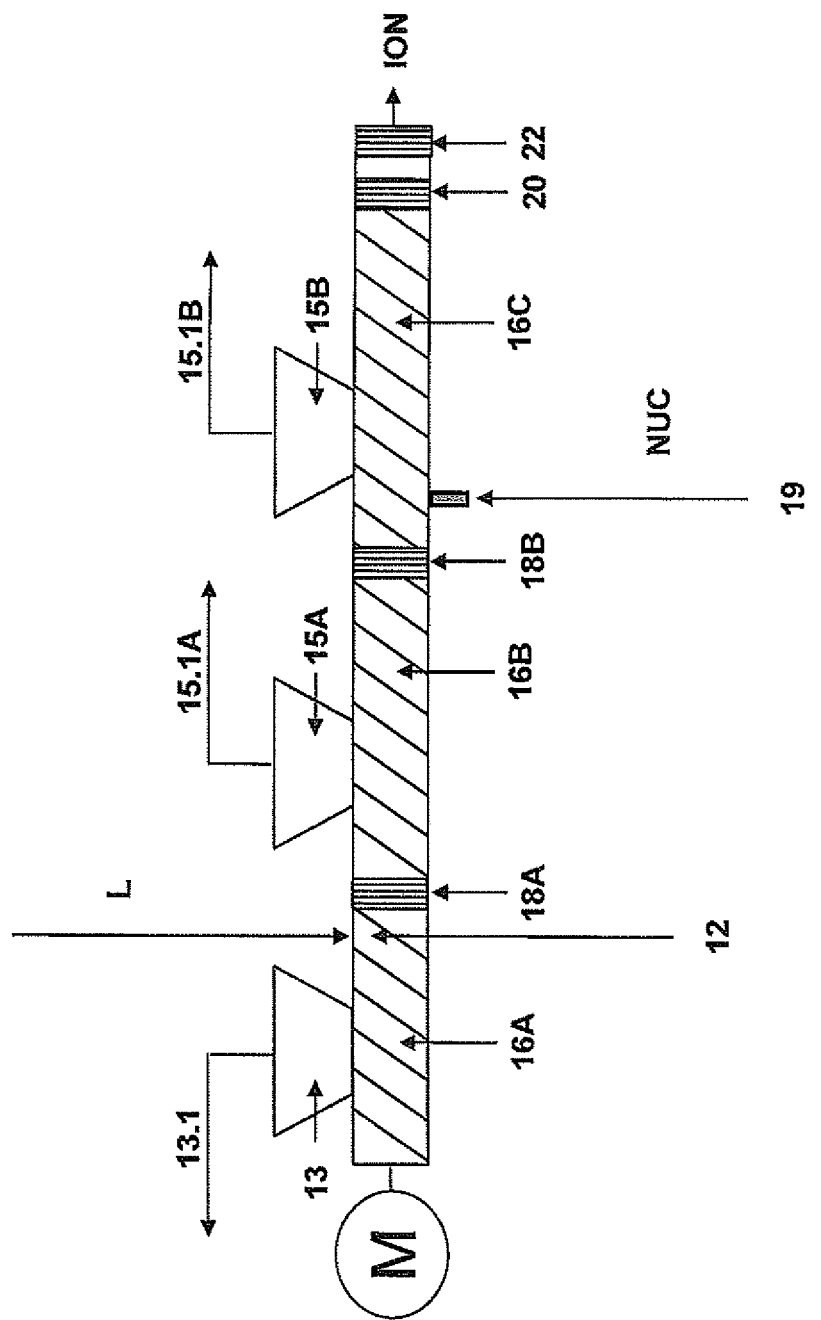
FIG. 3 shows an extruder unit comprising three extruder degassing sections three accumulating sections, a side feeder and one outlet section, whereby one extruder degassing section is a backward degassing section.

Another embodiment of the invention is shown in FIG. 3. FIG. 3 shows another flow chart and suitable device for the accomplishment of the process according to the invention comprising an extruder unit comprising three extruder degassing sections having three conveying sections 16A, 16B and 16C each connected to a vent port 13, 15 A and 15 B and a vapour line 13.1, 15.1A and 15.1.B, three accumulating sections 18A, 18B and 20 terminating the conveying sections 16 A, 16B and 16 C and an outlet section 22. In addition to that the extruder unit further comprises a side feeder 19.

Generally, the extruder unit may comprise one or more side feeders, which may positioned anywhere in the extruder, preferably in close proximity to the feeding point or the outlet section 22. Side feeders are suitable for the addition of additives to the polymer and in particular for the alternative or additional addition of nucleophiles and/or fillers.

Generally, nucleophiles and, where applicable fillers, may be added to
to fluid F, G or H or
to concentrated fluid L i.e. before fluid L is fed into the extruder or
anywhere within the extruder unit before the outlet section whereby this is preferably done using a side feeder Where nucleophiles and fillers are fed into the extruder unit to prepare polymer nanocomposites the addition of nucleophiles and fillers may be effected independently of each other. However, it is preferred to add the filler simultaneously or after the nucleophile in downstream direction.

Fillers may be added for example as a solid e.g. by means of a stuffer screw or in form a paste, slurry or suspension e.g. by means of a liquid pump.

Nucleophiles, depending on their state of aggregation, may be added as liquid (melt), solid or as solution.

Figure 5:
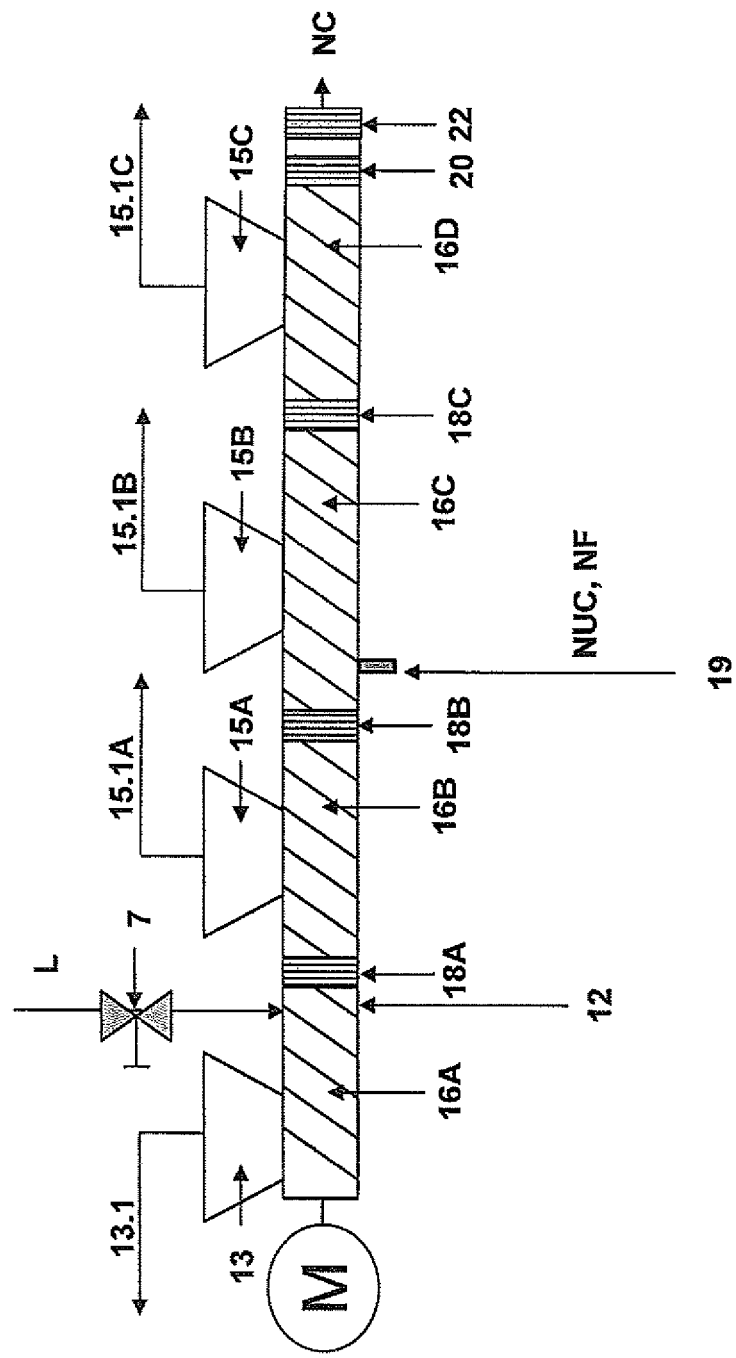
FIG. 5 shows an extruder unit comprising a pressure regulation device, four extruder degassing sections, four accumulating sections, a side feeder and one outlet section, whereby one extruder degassing section is a backward degassing section.

The liquid used to prepare aforementioned pastes, slurries, suspensions or solutions has preferably the same or similar composition as the volatile compounds which are part of liquid L The addition of nucleophiles and fillers through a side feeder is shown in FIG. 5.

Figure 6:
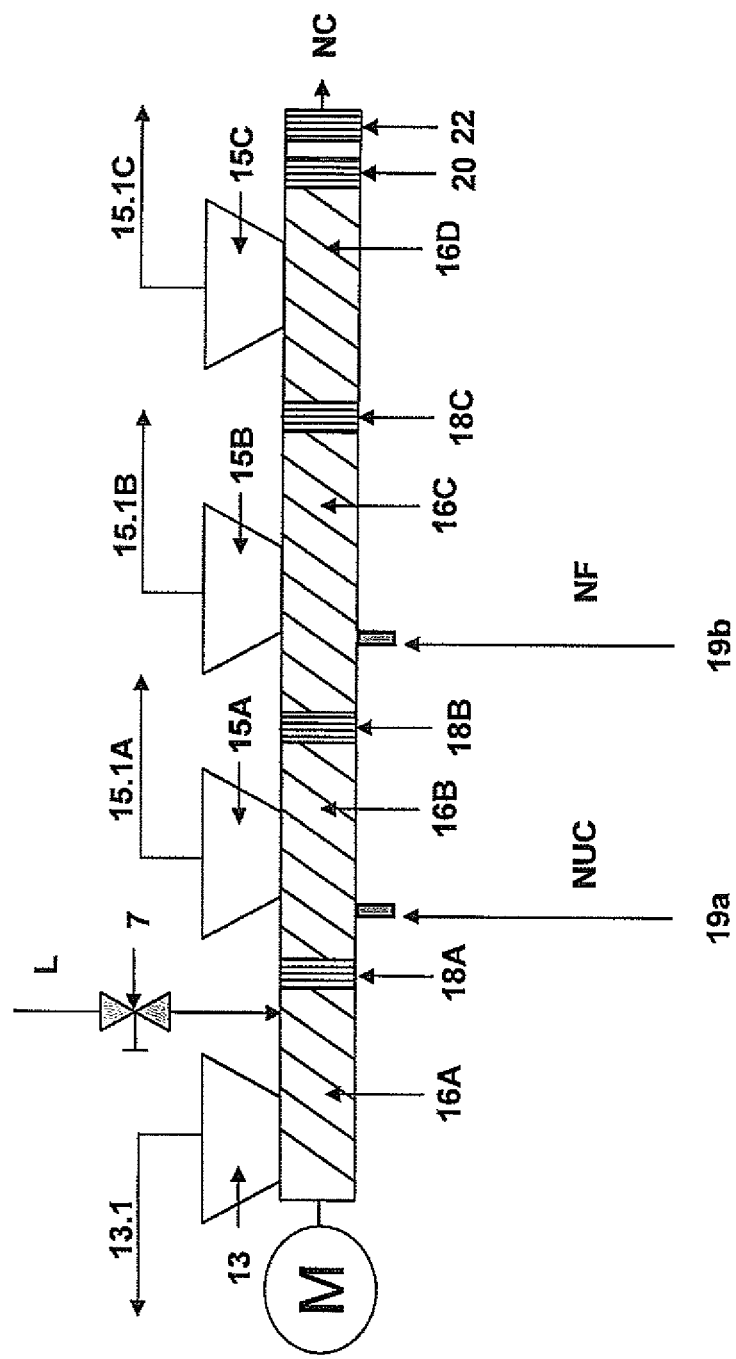
FIG. 6 shows an extruder unit comprising a pressure regulation device, four extruder degassing sections, four accumulating sections, two side feeders in different extruder degassing sections and one outlet section, whereby one extruder degassing section is a backward degassing section.

The addition of nucleophiles and fillers through different side feeders in different conveying sections is shown in FIG. 6.

The addition of nucleophiles at different locations (NUC1, NUC2 and NUC3) is shown in FIG. 7.

Examples of additives, in particular for rubber ionomers and/or polymer nanocomposites include stabilizing agents, acid scavengers like ESBO (epoxidized soy bean oil), stearates like calcium stearates, antioxidants and the like. Examples of suitable antioxidants include sterically hindered phenols like butylhydroxytoluenes and its derivatives like Irganox 1010 and 1076, amines, mercapto-benzimidazoles, certain phosphites and the like.

In particular, bromobutyl rubbers and the ionomers and nanocomposites derived therefrom are mixed with additives, e.g. 0.0001 to 4 phr epoxidized soy bean oil (ESBO), 0.0001 to 5 phr calcium-stearate and 0.0001 to 0.5 phr of antioxidants (phr=parts per hundred rubber with respect to rubber weight). Other additives are also applicable, dependent on the application of the butyl rubber product, i.e. fillers or colorants.

Figure 4:
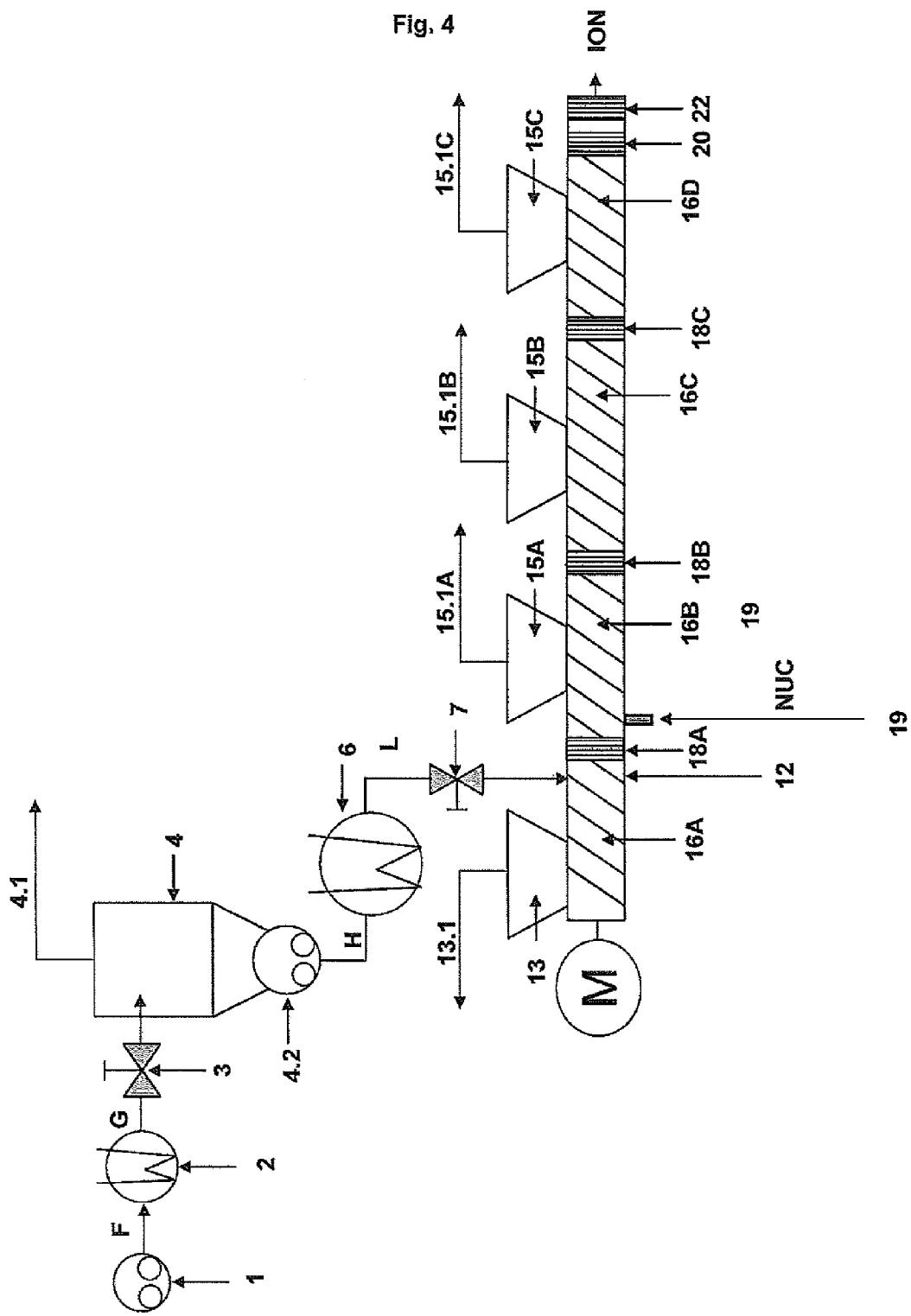
FIG. 4 shows a single-stage concentrator unit comprising a pressure regulation device, a reheating unit and an extruder unit comprising a pressure regulation device, four extruder degassing sections, four accumulating sections, a side feeder and one outlet section, whereby one extruder degassing section is a backward degassing section.

Another embodiment of the invention is shown in FIG. 4. FIG. 4 shows another flow chart and suitable device for the accomplishment of the processes according to the invention including the steps i) and ii) comprising a concentrator unit with a pump 1, a heater 2, a degassing vessel 4, a vapour line 4.1 and a pump 4.2, a reheating unit comprising a heater 6 and extruder unit comprising four extruder degassing sections having four conveying sections 16A, 16B, 16C and 16D each connected to a vent port 13, 15A, 15B and 15C and vapour lines 13.1, 15.1A, 15.1B and 15.1C, four accumulating sections 18A, 18B, 18C and 20 terminating the conveying sections 16 A, 16B, 16C and 16D and an outlet section 22. In addition to that the extruder unit further comprises a side feeder 19.

In step i) Fluid F containing at least one brominated rubber and at least one volatile compound is transferred via pump 1 to the heater 2, where the fluid F is heated.

Fluid F, also called cement, contains for example from 3 to 50 wt % of a brominated rubber, and from 60 to 97 wt.-% volatile compounds, in particular a solvent or a solvent and water, whereby the aforementioned components add up to 90 to 100, preferably 95 to 100 wt.-% of the total mass of fluid F.

The solvent is preferably selected from the group consisting of linear or branched alkanes having between 4 and 10 C atoms. More preferred solvents are n-pentane, iso-pentane, n-hexane, cycle-hexane, iso-hexane, methyl-cyclopentane, methyl-cyclohexane and n-heptane as well as mixtures of those alkanes.

In a preferred embodiment of the invention, fluid F contains from 3 to 40 wt % of a brominated rubber and from 60 to 95 wt.-% volatile organic compounds, in particular a solvent, and from 0.5 to 20 wt.-% water, whereby the aforementioned components add up to 95 to 100 wt.-% of the total mass of fluid F.

The fluid F is typically obtained from bromination processes or other processing steps. Fluids F containing water are typically obtained after neutralization processes following bromination.

The fluid F entering the heater typically and preferably has a temperature of 10° C. to 100° C., preferably of 30° C. to 80° C. The viscosity of fluid F is for example in the range of 100 mPa*s to 25,000 mPa*s, preferably in the range of 500 mPa*s to 5,000 mPa*s.

A heater may be any device that is able to raise the temperature of Fluid F. In a preferred embodiment, heater 2 is a heat exchanger. The heating medium is selected from the group consisting of steam, heating oil or hot pressurized water. The heat exchanger is for example of shell-and-tube type, where the fluid F is inside the tubes and the heating medium is on the shell side. Special inserts in the tubes may be applied to enhance heat transfer. Another type of heat exchanger may also be used, in which fluid F is on the outside of the heat exchanger tubes. The advantage of the aforementioned types of heat exchangers is the avoidance of maldistribution and easy maintenance as well as good heat transfer, Said heat exchangers are well known and commercially available. In a less preferred embodiment Plate type heat exchangers may also be applied.

Upon heating, heated fluid G is obtained. The heated fluid G has a higher temperature than fluid F, preferably a temperature of 100 to 200° C., more preferably 110° C. to 190° C. and even more preferably 120° C. to 175° C. The heated fluid G is then conveyed further into a degassing vessel 4. In the degassing vessel, the volatile compounds at least partially evaporate. The vapors are separated and removed from the heated fluid G by a vacuum line 4.1. The pressure in the degassing vessel 4 is for example in the range of 100 hPa to 4,000 hPa, preferably in the range of 200 hPa and 2,000 hPa and more preferred in the range of 230 to 1,100 hPa.

The vapors removed via the vacuum line 4.1 are preferably condensed and recycled into the process for preparation of fluid F. After degassing and separation a concentrated fluid H is obtained, which is removed from the degassing vessel 4 by means of a pump 4.2.

Generally the degassing vessel may be a flash evaporator or another device typically used to remove volatile compounds while simultaneously having short retention times.

In a preferred embodiment of the invention the degassing vessel is designed in the shape of a cyclone to further aid separation of vapor from heated fluid G. In another preferred embodiment of the invention the degassing vessel 4 has a conical or at least torisperical shaped bottom, to allow the vessel being emptied completely or substantially complete.

The pump 4.2 is preferably directly connected to the outlet of the degassing vessel 4. In general, the connection piece between pump and vessel is preferably as short as possible.

Due to the high viscosity of the concentrated fluid H at this stage, the inlet of the pump is preferably designed with a large inlet, thereby reducing the pressure drop at the inlet.

The pump 4.2 may be selected from the group consisting of positive displacement type pumps, gear pumps, piston pumps, membrane pumps, screw type pumps, extruder type pumps like counter-rotating or co-rotating single or twin screw extruders or kneader type pumps. Positive displacement type pumps and gear pumps are preferred, gear pumps are even more preferred.

In another preferred embodiment the pump 4.2 comprises a combination of an extruder or a kneader and a gear pump whereby the gear pump is fed from the extruder or kneader.

The amount of volatile compounds that is removed in this step i) is for example dependent on the temperature of fluid G and the pressure in the degassing vessel 4. In a preferred embodiment of the invention the temperature of fluid G and the pressure in the degassing vessel 4 are chosen so that the concentrated fluid H is preferably free-flowing as defined above and comprises for example from 10 to 60, preferably from 25 to 60 wt % of a brominated rubber and from about 40 to about 90, preferably from 40 to 75 wt.-% volatile compounds whereby the aforementioned components non-volatile polymer, volatile organic compound and water add up to 90 to 100 wt.-%, preferably to 95 to 100 wt.-% of the total mass of fluid H.

In a preferred embodiment and where the feedstock fluid F comprises water, fluid H for example comprises from 10 to 60, preferably from 25 to 60 wt % of a brominated rubber, from about 25 to about 90, preferably from 25 to 75 wt.-% volatile organic compounds, in particular a solvent, and about 0.5 to about 15 wt.-% water, whereby the aforementioned components non-volatile polymer, volatile organic compound and water add up to 90 to 100 wt.-%, preferably 95 to 100 wt.-% of the total mass of fluid H.

The temperature of the concentrated fluid H is lower than that of heated fluid G and is for example in the range of 15 to 100° C., preferably in the range of 30 to 100° C. The concentrated fluid H is preferably free-flowing as defined above.

In step ii), the concentrated fluid H obtained in step a) is then passed through a reheating unit 6 to obtain a reheated concentrated fluid L. The a preferred embodiment the reheating unit comprises a heat exchanger, whereby the same disclosure including the preferences with regard to heating media and heat exchanger types apply as described above for heat exchanger 2.

The temperature of the reheated concentrated fluid L is higher than that of the concentrated fluid L and is for example in the range 50° C. to 200° C., preferably in the range of 90° C. to 180° C. The reheated concentrated fluid L is preferably free-flowing as defined above.

In one embodiment of the invention the nucleophiles (NUC) may already be added to fluid F as depicted in FIG.

7 (NUC(1)). However, addition of the nucleophile to concentrated fluid L or anywhere within in the extruder unit before the outlet section is preferred.

In a preferred embodiment of the invention step i) is repeated a least once, preferably once or twice. The advantage of repeating step i) is that the total energy consumption to produce the fluid L can be significantly reduced due to easier operation parameter optimization for each concentration unit. The repetition of step i) is preferably accomplished by connecting the respective number of concentrating units in series.

In a preferred embodiment of the invention the concentration unit, the reheating unit or the extruder unit may independently of each other be equipped with one or more pressure regulation devices which allow the very precise operation of the units under predefined conditions.

The pressure regulation devices may be active or passive, whereby active pressure regulation devices are preferred. Examples of active pressure regulation devices include control valves like a pressure relief valve, examples of passive pressure regulation devices include nozzles and dies or orifice plates. Suitable valves may be selected from ball, piston, gate or needle valves.

In case of a passive pressure control device, it is preferred to calculate an orifice to cause a certain pressure drop. The calculation is based on viscosity of the fluid at that point and the throughput. Anyone skilled in the art can perform this calculation.

Active pressure control devices are typically controlled by a pressure measurement upstream of the device. The pressure is for example measured and compared to the set point. The pressure control device is then adjusted according to the offset recognized.

Alternatively the pressure drop across the device is measured instead of the absolute pressure upstream of the pressure control device. The valve position is adjusted manually, electrically, pneumatically or hydraulically. The control of the valve position, i.e. adjustment to the set point pressure, can for example be made manually or from any automated process control system.

In a further aspect the invention therefore relates to the use of an device as described above which further comprises
  one concentrating unit comprising a heater (2) in communication with a degassing vessel (4), whereby the bottom part of the degassing vessel (4) is in communication with a pump (4.2) the upper part of the degassing vessel (4) is in communication with at least one vapour line (4.1)
  one heating unit (6) in communication with the pump (4.2) of the concentrating unit and a feeding point (12) on an extruder unit and optionally
  a one or more pressure regulation devices In the context of this invention the term "in communication" includes direct or indirect connections whereby indirect connections may be accomplished for example via tubes or pipes, The term "in communication" further includes the option that between the units or means in communication further units or means are arranged.

A further embodiment of the invention having additional pressure control devices is for example shown in FIGS. 4, 5, 6 and 7. The pressure of heated fluid G is controlled by the pressure control device 3 (FIG. 4), the pressure of concentrated fluid L entering the extruder is controlled by the pressure control device 7 (FIGS. 4, 5, 6 and 7).

It was further found that a significant reduction of remaining hydrophilic compounds or water or both can be achieved in an advantageous way by preparing the fluid F in a process of removing hydrophilic compounds and optionally water from a crude fluid A containing at least one nonbrominated rubber, at least one volatile organic compound, one or more hydrophilic compounds and optionally water which comprises at least the step of
  pre i) treating the crude fluid (A) in at least one pre-washing unit comprising at least a separating apparatus (26), whereby the fluid (A) is mixed with water to obtain an organic phase (28) comprising primarily non-volatile polymer and volatile organic compounds and an aqueous phase (27) comprising primarily water and hydrophilic compounds, and whereby the organic phase (28) is separated from the aqueous phase (27) in a separating apparatus (26) and further used as fluid F and whereby at least a part of the aqueous phase (27) is removed from the separating apparatus (fluid C).

In the context of this invention the term "hydrophilic compounds" denotes at least partially water-soluble volatile and non-volatile compounds. Examples include inorganic salts and in particular residues of catalysts employed for the polymerization reaction like e.g. aluminum salts, iron or other transition metal salts and in particular inorganic bromides resulting from bromination reactions and subsequent neutralizations.

Exemplary embodiments of step pre-i) are illustrated using FIG. 7.

In step pre-i) crude fluid A containing at least one non-volatile polymer, at least one volatile compound and at least one hydrophilic compound is fed to the mixing section 30 of the separating apparatus 26, which is equipped with a mixer 32 and passes through the separating wall 34 into a settling section, where the mixture separates into an aqueous phase 27 and an organic phase 28, whereby the separation is supported by means of a coalescer 29. A part of the aqueous phase 27 is removed from the separating apparatus 26 as fluid C, which is typically disposed of, with the rest being enriched with fresh water E and recycled via the recirculation line 38 by the action of recirculation pump 36 back into the mixing section 30. The organic phase 28 is removed and subjected to the subsequent process steps as fluid F.

Generally, the coalescer in the pre-washing step is beneficial, but not mandatory. It helps to collect and coalesce the droplets and guides them to the phase interface which typically results in shorter residence times. Suitable examples of coalescers include structured or unstructured packings. Structured packings are for example flat plates, flat vanes, roof-shaped vanes and vanes with holes in vertical direction. The vanes or plates may be positioned rectangular or parallel to the main flow direction or with a slope. Unstructured packings are for example wire mesh, packings made of rings, spheres, cylinders, irregularly shaped geometries and weirs like distributor plates that have holes or slits, vertical plates covering a portion of the main flow path. The packings can be made of any technically feasible material, e.g. metals, glass, ceramic, coated metals, lined metals and polymeric materials like for example PTFE, ETFE, polyethylene (PE), polyetheretherketone (PEEK), Polypropylene (PP), polyamide (PA) and polyvinylidenfluoride (PVDF).

In a preferred embodiment of the invention step pre-i) is repeated at least once, preferably once.

In a preferred embodiment of the invention the separation is performed at temperatures of more than 40° C. The upper limit depends on the constitution of the polymer and the construction of the separating apparatus. Typically the upper limit is 125° C.

In a more preferred embodiment of the invention the separation is performed at temperatures of 40 to 110° C. preferably at temperatures of 80 to 110°.

Depending on the composition of fluid A and the boiling points of the components thereof, the separating apparatus may be designed to be operated under pressure.

Generally, the efficiency of the pre-washing step increases with increased temperature.

In another embodiment of the invention the organic phase 28 leaving the separating apparatus may be pre-heated to facilitate the free-flow of fluid F. This purpose can also be accomplished by a heater, whereby heat exchangers as disclosed for heater 2 above are preferred.

For example, a fluid A stemming from the bromination of butyl rubber typically contains inorganic bromide levels of 3,000 to 5,000 ppm calculated on the mass of bromobutyl rubber. Upon performance of step pre-i) this level can be reduced to less than 500 ppm, preferably to less than 300 ppm and even more preferably to less than 100 ppm.

It was further found that the performance of step pre-i) allows to significantly reduce the water content of fluid F compared to fluid A, which contributes to a significantly lower energy consumption for the subsequent processing steps.

In another embodiment, fluid A is obtained by a process comprising at least the steps of I) providing a reaction medium comprising
   a common aliphatic medium comprising at least 50 wt.-% of one or more aliphatic hydrocarbons having a boiling point in the range of 45° C. to 80° C. at a pressure of 1013 hPa, and
   a monomer mixture comprising at least one monoolefin monomer, at least one multiolefin monomer and either no or at least one other co-polymerizable monomer in a mass ratio of monomer mixture to common aliphatic medium of from 40:60 to 95:5, preferably from 50:50 to 85:15 and more preferably from 61:39 to 80:20;
II) polymerizing the monomer mixture within the reaction medium to form a rubber solution comprising a rubber polymer which is at least substantially dissolved in the medium comprising the common aliphatic medium and residual monomers of the monomer mixture;
III) separating residual monomers of the monomer mixture from the rubber solution to form a separated rubber solution comprising the rubber polymer and the common aliphatic medium,
IV) brominating the rubber polymer in the separated rubber solution to obtain fluid A, a solution comprising the brominated rubber and the common aliphatic medium, As used herein the term "at least substantially dissolved" means that at least 70 wt.-%, preferably at least 80 wt.-%, more preferably at least 90 wt.-% and even more preferably at least 95 wt.-% of the rubber polymers obtained according to step II) are dissolved in the medium. Such a process is known from WO 2010/006983 A, which is incorporated herein in its entirety.

EXAMPLES

Analytical Methods

Water content of fluids: The sample was put into a centrifuge and spun for 5 min at 4000 rpm at room temperature. The water was then collected at the bottom of the vial and weighed.

Total volatiles concentration: A rubber sample was cut into small pieces of 2×2 mm size. Roughly 30 g of rubber pieces were put in an alumina crucible. The weight of the crucible and the rubber was determined. The crucible including the rubber sample was then placed in a vacuum oven at a vacuum level of 130 hPa for 60 min at a temperature of 105° C. After drying, the crucible was placed in an exsiccator and let cool down for 30 min. The crucible was then weighed again. The loss in weight was determined.

Residual solvent concentration in products: The residual solvent concentration in the product was determined by headspace gas chromatography. A weighed portion (0.5+−0.005 g) of sample was placed in a headspace vial, and a measured amount of solvent (1,2 dichlorobenzene, ODCB) was added. The vial was sealed and shaken until the rubber was dissolved. The vial was heated until the volatile organic compounds were distributed at equilibrium between the sample and the gas phase in the vial (headspace). An aliquot of the headspace gas was injected into a stream of carrier gas, which carries the sample along a chromatographic column. Standards of known composition were used to calibrate the GC. Toluene was added to the solvent for use as an Internal Standard.

Residual water concentration in products: The total volatiles concentration is the sum of water, solvents and monomers. As the monomer concentration is usually less then 0.0005 wt.-% A, the water content can be determined by subtracting the solvent concentration from the total volatiles concentration.

Solvent concentration in fluids: The concentration of solvents in fluids were measured using gas chromatography. The internal standard was isooctane. The sample was diluted with toluene and then injected into the gas chromatograph. The gas chromatography was performed on a HP 6890 chromatograph, with following specifications:
   column type DB-5 of J&W, length 60 m, diameter 0.23 mm, film thickness 1.0 μm
   injector temp.: 250° C.
   detector temp.: 350° C.
   carrier gas: Helium
   column pressure: 96 kPa
   detector: FID Viscosity of fluids: The viscosity was measured in a rotational rheometer of cone-plate type. All given viscosities refer to the extrapolated zero shear viscosity.

Ionomer content: Ionomer content was measured by $^1$H and $^{31}$P NMR spectroscopy.

Viscosity of solids: The viscosity was measured using a Mooney viscometer of rotating disc type. Viscosities were measured using a large rotor at 125° C. with a one minute pre-heat time and an eight minute measurement time (ML (1+8)@125° C.).

Oxygen permeability: Oxygen permeability was measured using a Macon Ox-Tran® model 2/61 permeability tester at 40° C. Rubber samples for permeability testing were compounded in a standard sulfur cured tire innerliner formulation and cured into thin sheets at 160° C.

Example 1

Concentration and Extrusion

The Device

The device used for the examples was similar to the one shown in FIG. 4. A piston pump was used to pump the fluid (F) to heater (2). The heater (2) was a single tube-in-tube type heat exchanger. The internal pipe was equipped with a static mixer of Kenics type, the diameter of the internal pipe was 15 mm. The tube was heated by a tube shaped shell. The heating medium was heating oil (Marlotherm). A pressure relief valve (3) was installed prior to the degassing vessel (4), the pressure upstream of the valve was controlled automatically to a set point value. This set point was chosen so that boiling in the heated fluid (G) was prevented. The heated fluid (G) was introduced into the degassing vessel (4) from the top. The conical outlet of the degassing vessel (4) was equipped with a pump (4.2), which was a combination of an extruder type pump and a gear pump. In step ii), the concentrated fluid H obtained in step i) was then passed through a reheating unit (6) which was a single tube-in-tube type heat exchanger. The internal pipe diameter was 20 mm, the internal pipe was equipped with a static mixer of type SMX. Heating was accomplished by a tube shell using a heating oil (Marlotherm) as heating medium.

In step a) the concentrated fluid L and the nucleophile were mixed and fed into the extruder unit. The extruder of the extruder unit was a co-rotating twin screw extruder with a screw diameter of 32 mm and a screw length of 1260 mm. The extruder unit further comprised a nozzle as a pressure control device (7, see FIG. 7) upstream the feeding point (12) of the extruder, three extruder degassing sections, whereby the feeding point (12) was located at the first extruder degassing section, whereby the first extruder degassing section comprised a conveying section (16A), a rear vent port (13) connected to a vapor line (13.1) in upstream direction and whereby the extruder unit further comprised two downstream extruder degassing sections each comprising a conveying section 16B and 16 C), a vent port (15A and 15B), whereby the vent ports (15A and 15B) were each connected to a vapour line (15.1A and 15.1B) and whereby each of the conveying sections (16A, 16B and 16C) was terminated by a accumulating section (18A, 18B and 20) and whereby the extruder unit further comprised an outlet section (22).

Each of the sections, in particular the conveying sections could be independently heated through the barrel of the extruder in order to control the temperature of the rubber anywhere in the extruder.

The rear vent port (13) was connected to a condenser via a first vapor line (13.1). The condenser was a plate type heat exchanger and further connected to a liquid ring vacuum pump. The other vapor lines (15.1A and 15.1B) were connected to a condensing system comprising a screw type dry running vacuum pump.

The first accumulating section (18A) was made of kneading blocks, the second accumulating section (18B) was made of kneading blocks and a back conveying element. Both accumulating sections (18A and 18B) were designed to allow the injection of a stripping agent.

A sight glass was installed in the vent port (15.1B) to allow the observation of the conveying behavior and of the product properties in the conveying section (16C).

The kneading zone (20) and outlet section (22) were combined into one functional section. The accumulating section zone was composed of a die plate and a nozzle forming a strand of rubber which was formed into rubber crumbs at the outlet section.

Preparation of Fluid F

A crude butyl rubber solution was taken from a commercial production plant, allowed to settle several hours and the organic phase separated from the bulk aqueous phase. The organic phase was then used to perform the experiments as fluid (F). Fluid (F) contained (a) 25 or (b) 20 wt % rubber, 70 wt % hexanes and (a) 5 or (b) 10 wt % water calculated on 100 wt % of these three components.

The bromobutyl rubber, dissolved in the fluid (F), had the following properties:

Mooney (ML 1+8, 125° C.) of 28 to 36, Bound bromine content of 1.6 to 2.0 wt %.

The viscosity of Fluid F at 60° C. was 1,760 mPa*s for (b).

Example 2

Fluid F as described above for (b) is used as feedstock (fluid F). The throughput of fluid F is set to 10 kg/h, which corresponds to around 2.0 kg/h of the bromobutyl rubber.

The heating temperature of the heater (2) is set to 155° C., the pressure in the separating vessel (4) to 475 hPa. The temperature of the heating medium of the reheating unit (6) is set to 156° C., the pressure in the rear vent port (13) was 475 hPa.

A 25 wt.-% solution of triphenylphosphine is added to fluid L in an amount of 0.32 kg/h. The barrel temperature of the extruder is set to 150° C.

The pressure in the second and third vent port (15A and 15B) is lowered to 11 hPa. No stripping agent is fed into the accumulating section (18B). The resulting rubber ionomer appears white to pale orange and is permanently drawn in and kneaded by the action of the screw shafts. At the outlet section (22) a strand of rubber ionomer is produced.

The final product collected at the outlet section is analyzed to determine the hexane and total volatiles concentration. The total volatiles content of the rubber ionomer is typically below 2 wt.-%, the hexane content below 1 wt-% and the water content below 1 wt.-%, The resulting rubber ionomer is dried and analyzed by $^1$H and $^{31}$P NMR to confirm ionomer content. Example 3 Fluid F as described above for (b) is used as feedstock. The throughput of fluid F is again set to 10 kg/. The heating temperature of the heater (2) is set to 155° C., the pressure in the separating vessel (4) to 475 hPa. The temperature of the heating medium of the reheating unit (6) is set to 156° C., the pressure in the rear vent port (13) is 475 hPa. The barrel temperature of the extruder is 150° C. The pressure in the second and third vent port (15A and 15B) is lowered to 11 hPa.

A 25 wt.-% solution of triphenylphosphine (0.08 kg/h) and a nanoclay (Cloisite™ 15A, 0.4 kg/h) is added to fluid L. The resulting polymer nanocomposite appears white to pale orange and is permanently drawn in and kneaded by the action of the screw shafts. At the outlet section (22) a strand of polymer nanocomposite is produced.

The total volatiles content of the polymer nanocomposite is typically below 2 wt.-%, the hexane content below 1 wt.-% and the water content below 1 wt.-%. The resulting rubber ionomer is analyzed by $^1$H and $^{31}$P NMR to confirm ionomer content. Nanoclay exfoliation is confirmed by X-ray diffraction analysis.

Examples 4 and 5

Examples 3 and 4 are repeated using a solution of 30 wt.-% of commercially available bromobutyl rubber (BB2030 of Lanxess Inc.) as fluid L i.e. without a preceding concentration step. The results obtained are comparable to those obtained for examples 2 and 3. Product formation of rubber ionomers and polymer nanocomposites is observed in both cases.

Examples 6 to 10

Fluid F as described above for (a) is used as feedstock (fluid F). The throughput of fluid F is set to 4 kg/h, which corresponds to around 1.0 kg/h of the bromobutyl rubber.

The heating temperature of the heater (2) is set to 155° C., the pressure in the separating vessel (4) to 475 hPa. The temperature of the heating medium of the reheating unit (6) is set to 156° C., the pressure in the rear vent port (13) was 475 hPa.

A 7.5 wt.-% solution of triphenylphosphine is added to fluid L iso an amount of 0.0 to 0.8 kg/h. The barrel temperature of the extruder is set to 150° C.

The pressure in the second and third vent port (15A and 15B) is lowered to 11 hPa. No stripping agent is fed into the accumulating section (18B). The resulting rubber ionomer appears pale orange in colour and is permanently drawn in and kneaded by the action of the screw shafts. At the outlet section (22) a strand of rubber ionomer is produced.

The final product collected at the outlet section is analyzed to determine the hexane and total volatiles concentration. The total volatiles content of the rubber ionomer is typically below 2 wt.-%, the hexane content below 1 wt.-% and the water content below 1 wt.-%. The resulting rubber ionomer is dried and analyzed by $^1$H and $^{31}$P NMR to confirm ionomer content.

Examples 11-15

Fluid F as described above for (a) is used as feedstock. The throughput of fluid F is again set to 4 kg/. The heating temperature of the heater (2) is set to 155° C., the pressure in the separating vessel (4) to 475 hPa. The temperature of the heating medium of the reheating unit (6) is set to 156° C., the pressure in the rear vent port (13) is 475 hPa. The barrel temperature of the extruder is 150° C. The pressure in the second and third vent port (15A and 15B) is lowered to 11 hPa.

A 7.5 wt.-% solution of triphenylphosphine (0.0 to 0.8 kg/h) and a nanoclay (Nanomer™ I.44P, 0.1 kg/h) is added to fluid L. The resulting polymer nanocomposite appears orange-brown in colour and is permanently drawn in and kneaded by the action of the screw shafts. At the outlet section (22) a strand of polymer nanocomposite is produced.

The total volatiles content of the polymer nanocomposite is typically below 2 wt.-%, the hexane content below 1 wt.-% and the water content below 1 wt.-%. The resulting rubber ionomer is analyzed by $^1$H and $^{31}$P NMR to confirm ionomer content. Nanoclay exfoliation is confirmed by X-ray diffraction analysis.

The results of examples 6 to 15 are given in table 1

TABLE 1

| | Example | | | | | | | | | |
|---|---|---|---|---|---|---|---|---|---|---|
| | 6 | 7 | 8 | 9 | 10 | 11 | 12 | 13 | 14 | 15 |
| Formulation (phr) | | | | | | | | | | |
| BB2030 | 100 | 100 | 100 | 100 | 100 | 100 | 100 | 100 | 100 | 100 |
| Triphenylphosphine (TPP) | 0 | 1 | 2 | 4 | 6 | 0 | 1 | 2 | 4 | 6 |
| Nanomer I.44P | | | | | | 10 | 10 | 10 | 10 | 10 |
| TOTAL | 100 | 101 | 102 | 104 | 106 | 110 | 111 | 112 | 114 | 116 |
| Process Parameters | | | | | | | | | | |
| BB2030 cement concentration (wt %) | 25.0 | 25.0 | 25.0 | 25.0 | 25.0 | 25.0 | 25.0 | 25.0 | 25.0 | 25.0 |
| BB2030 Cement (kg/hr) | 4.0 | 4.0 | 4.0 | 4.0 | 4.0 | 4.0 | 4.0 | 4.0 | 4.0 | 4.0 |
| Rubber Prod. Rate (kg/hr) | 1.0 | 1.0 | 1.0 | 1.0 | 1.0 | 1.0 | 1.0 | 1.0 | 1.0 | 1.0 |
| TPP soln. conc. (wt %) | 7.5 | 7.5 | 7.5 | 7.5 | 7.5 | 7.5 | 7.5 | 7.5 | 7.5 | 7.5 |
| TPP Soln. (kg/hr) | 0.0 | 0.13 | 0.27 | 0.53 | 0.80 | 0.00 | 0.13 | 0.27 | 0.53 | 0.80 |
| Extruder Temp. (° C.) | 150 | 150 | 150 | 150 | 140 | 110 | 110 | 110 | 120 | 120 |
| Melt Temp. (° C.) | 155 | 165 | 160 | 160 | 160 | 135 | 135 | 145 | 145 | 150 |
| Analysis Results | | | | | | | | | | |
| Ionomer content (mol %) | 0.00 | 0.05 | 0.08 | 0.11 | 0.30 | 0.00 | 0.07 | 0.12 | 0.38 | 0.22 |
| Mooney Viscosity (ML(1 + 8)@125° C.) | 34.6 | 43.0 | 59.1 | 63.1 | 59.8 | 45.8 | 73.7 | 82.0 | 72.4 | 72.1 |
| Oxygen Permeability at 40° C. (cc · mm/m$^2$ · day) | 180.0 | | | | | 164.6 | 151.4 | 149.2 | 139.1 | 138.0 |
| Reduction in oxygen permeability vs control (%) | 0.0 | | | | | 8.5 | 15.9 | 17.1 | 22.7 | 23.3 |

The foregoing describes only certain preferred embodiments and other features and aspects of the invention will be evident to persons skilled in the art. Variants or equivalents of described elements that function in the same way may be substituted without affecting the way in which the invention works. All sub-combinations of the described features are intended by the inventor to be encompassed by the following claims.

The reference numerals used hereinbefore are summarized below:
1 pump
2 heater
3 pressure control device
4 degassing vessel
4.1, vapor line
4.2, pump
6 reheating unit
7 pressure control device
12 feeding point
13 rear vent port (upstream)
13.1 vapor line
15, 15A, 15B, 15C vent port (downstream)
15.1, 15.1A, 15.1B, 15.1C vapor line
16, 16A, 16B, 16C, 16D conveying section (downstream)
18, 18A, 18B, 18C accumulating section
19, 19A, 19B side feeder 20 last accumulating section
22 outlet section
26 separating vessel
27 aqueous phase
28 organic phase
29 coalescer
30 mixing section
32 mixer
34 separating wall
36 recirculation pump
38 recirculation line
A crude fluid A
C waste water
E fresh water
F fluid F
G heated fluid H
H concentrated fluid H
ION rubber ionomer
L concentrated fluid L
NC polymer nanocomposite
NF filler
NUC, NUC1, NUC2, NUC3 nucleophile

The invention claimed is:

1. A process for the preparation of rubber ionomers, the process comprising:
a) feeding
a concentrated fluid (L) containing at least one brominated rubber and at least one volatile compound, and
at least one nitrogen and/or phosphorous containing nucleophile into an extruder unit comprising:
an extruder degassing section comprising at least a conveying section and at least one vent port with one or more vapor lines,
an accumulating section, and
an outlet section, and
b) at least partially reacting the brominated rubber or the brominated rubbers with the nitrogen and/or phosphorous containing nucleophile or the nitrogen and/or phosphorous containing nucleophiles within the extruder unit forming rubber ionomers (ION) and simultaneously with the reacting, at least partially removing volatile compounds through the vent ports and vapor lines to produce ionomers having less than 2 wt % of volatile compounds.

2. A process for the preparation of polymer nanocomposites, the process comprising:
a*) feeding
a concentrated fluid (L) containing at least one brominated rubber and at least one volatile compound,
at least one nitrogen and/or phosphorous containing nucleophile, and
at least one filler
into an extruder unit comprising:
an extruder degassing section comprising at least a conveying section and at least one vent port with one or more vapor lines,
an accumulating section, and
an outlet section, and
b*) contacting the brominated rubber or the brominated rubbers with the nitrogen and/or phosphorous containing nucleophile or the nitrogen and/or phosphorous containing nucleophiles to form rubber ionomers (ION), and
further contacting the rubber ionomers (ION) with the brominated rubber or the brominated rubbers and the nitrogen and/or phosphorous containing nucleophile or the nitrogen and/or phosphorous containing nucleophiles and/or
at least one filler
to form polymer nanocomposites,
whereby the aforementioned reactions are at least partially effected within the extruder unit and whereby volatile compounds are at least partially, during the reaction, simultaneously removed through the vent ports and vapor lines to produce nanocomposites having less than 2 wt % of volatile compounds.

3. The process according to claim 1 or 2, wherein the concentrated fluid (L) is obtained by:
i) treating a fluid (F) in at least one concentrator unit comprising at least a heater, a degassing vessel (4) and a vapor line, whereby the fluid (F) is heated to produce a heated fluid (G), and the heated fluid (G) is fed into a degassing vessel where part of the volatile compounds are removed via the vapor line to obtain a concentrated fluid (H), and
ii) reheating the concentrated fluid (H) from step i) in at least one reheating unit to obtain the concentrated fluid (L).

4. The process according to claim 1 or 2, wherein the brominated rubbers are selected from the group consisting of bromobutyl rubbers and brominated terpolymers.

5. The process according to claim 1 or 2, wherein the nitrogen and/or phosphorous containing nucleophiles are those of formula 1

$$AR^1R^2R^3 \qquad (I)$$

wherein
A denotes nitrogen or phosphorus, and
$R^1$, $R^2$ and $R^3$ are, independently of each other, selected from the group consisting of $C_1$-$C_{20}$-alkyl, $C_6$-$C_{20}$-arylalkyl, or $C_5$-$C_{14}$-aryl.

6. The process according to claim 5, wherein the nitrogen and/or phosphorous containing nucleophiles are selected from the group consisting of:
trimethylamine, triethylamine, triisopropylamine, tri-n-butylamine, trimethylphosphine, triethylphosphine, triisopropylphosphine, tri-n-butyl-phosphine, triphenylphosphine, 2-dimethylaminoethanol, dimethylaminoethylacrylate, dimethylaminomethylacrylate, N-methylamino-bis-2-propanol, n-ethylamino-bis-2-propanol, dimethyaminoethyl-methacrylate, 1-dimethylamino-2-propanol, 2-(isopropylamino)ethanol, 3-dimethylamino-1-propanol, N-methyldiethanolamine, 2-(diethylamino)ethanol, 2-dimethylamino-2-methyl-1-propanol, 2-[2-(dimethylamino)-ethoxy]ethanol, 4-(dimethylamino)-1-butanol, N-ethyldiethanolamine, triethanolamine, tripropanolamine, aminolauric acid, betaine, 3-diethylamino-1-propanol, 3-(diethylamino)-1,2-propanediol, 2-{[2-(dimethylamino)ethyl]methylamino}ethanol, 4-diethylamino-2-butyn-1-ol, 2-(diisopropylamino)ethanol, N-butyldiethanolamine, N-tert-butyldiethanolamine, 2-(methylphenylamino)ethanol, 3-(dimethylamino)benzyl alcohol, 2-[4-(dimethylamino)phenyl]ethanol, 2-(N-ethylanilino)ethanol, N-benzyl-N-methylethanolamine, N-phenyldiethanolamine, 2-(dibutylamino)ethanol, 2-(N-ethyl-N-m-toluidino)ethanol, 2,2'-(4-methylphenylimino)diethanol, tris[2-(2-methoxyethoxy)ethyl]amine, 3-(dibenzylamino)-1-propanol, dimethyl hydrogenated tallow alkyl amine, or mixtures of the aforementioned nucleophiles.

7. The process according to claim 2, wherein the filler is a mineral filler.

8. The process according to claim 7, wherein the filler is selected from the group consisting of silica, synthetic or natural silicates, natural or organically modified clays, gypsum, alumina, titanium dioxide, talc, glass fibers, glass fiber products, metal oxides, metal carbonates, metal hydroxides, and combinations of the aforementioned fillers.

9. The process according to claim 7, wherein the filler is selected from the group of high aspect ratio fillers.

10. The process according to claim 1 or 2, wherein the temperature of the reheated concentrated fluid (L) is 50° C. to 200° C.

11. The process according to claim 1, wherein the extruder unit comprises means to operate separate zones of the extruder independently of each other at different temperatures so that the zones can either be heated, unheated or cooled.

12. The process according to claim 2, wherein the extruder unit comprises means to operate separate zones of the extruder independently of each other at different temperatures so that the zones can either be heated, unheated or cooled.

13. The process according to claim 1 or 2, wherein the extruder has an outlet section, and the outlet section comprises:
   means to allow the product to exit the extruder, and
   product processing equipment, whereby the processing equipment is selected from the group consisting of combinations of die plates and cutters; die plates and underwater-pelletizing means; means for crumb formation, turbulators, and fixed knifes placed at the end plate of the extruder.

14. The process according to claim 1 or 2, wherein the extruder has an outlet section, and the outlet section comprises cooling means, whereby the cooling means are selected from the group consisting of pneumatic crumb conveyers with convective air cooling, vibrating crumb conveyers with convective air cooling, vibrating crumb conveyer with cooled contact surfaces, belt conveyers with convective air cooling, belt conveyer with cooled belts, water spraying on hot crumbs upon outlet of the extruder, and underwater-pelletizing means.

15. The process according to claim 1 or 2, wherein the vent ports comprise means to prevent the concentrated fluid (L) or reaction products from coming out of the vent ports.

16. The process according to claim 1 or 2, wherein a stripping agent is added in the extruder unit.

17. The process according to claim 1 or 2, wherein the extruder unit comprises at least one extruder degassing section in upstream direction.

18. The process according to claim 3, wherein the nucleophiles are fed into the extruder unit by adding them
   to fluid (F), (G) or (H) or
   to concentrated fluid (L) or
   directly into the extruder unit anywhere within the extruder unit before the outlet section.

19. The process according to claim 3, wherein the fillers are fed into the extruder unit by adding them
   to fluid (F), (G) or (H) or
   to concentrated fluid (L) or
   directly into the extruder unit anywhere within the extruder unit before the outlet section.

20. The process according to claim 3, wherein fluid (F) is obtained by a process comprising:
   i) pretreating a crude fluid (A) in at least one pre-washing unit comprising at least a separating apparatus, whereby the fluid (A) is mixed with water to obtain an organic phase comprising primarily non-volatile polymer and volatile organic compounds and an aqueous phase comprising primarily water and hydrophilic compounds, and whereby the organic phase is separated from the aqueous phase in a separating apparatus and further used as fluid (F) and whereby at least a part of the aqueous phase is removed from the separating apparatus (fluid C).

21. The process according to claim 20, wherein crude fluid (A) is obtained by a process comprising:
   I) providing a reaction medium comprising
      a common aliphatic medium comprising at least 50 wt.-% of one or more aliphatic hydrocarbons having a boiling point of 45° C. to 80° C. at a pressure of 1013 hPa, and
      a monomer mixture comprising at least one monoolefin monomer, at least one multiolefin monomer and either no or at least one other co-polymerizable monomer in a mass ratio of monomer mixture to common aliphatic medium of from 40:60 to 95:5;
   II) polymerizing the monomer mixture within the reaction medium to form a rubber solution comprising a rubber polymer which is at least substantially dissolved in the medium comprising the common aliphatic medium and residual monomers of the monomer mixture;
   III) separating residual monomers of the monomer mixture from the rubber solution to form a separated rubber solution comprising the rubber polymer and the common aliphatic medium; and
   IV) brominating the rubber polymer in the separated rubber solution to obtain crude fluid (A), a solution comprising the brominated rubber and the common aliphatic medium.

22. The process according to claim 2, wherein the polymer nanocomposites are cured in a subsequent step c*).

23. An article of manufacture comprising the rubber ionomers, or the cured or uncured polymer nanocomposites obtained by the process according to claim 1, 2 or 22, wherein the article of manufacture is a tire, an adhesive, a thermoplastic elastomer, footwear, storage membrane, protective clothing, pharmaceutical stoppers, linings, or barrier coatings.

* * * * *